United States Patent
Niimura

(10) Patent No.: US 7,961,225 B2
(45) Date of Patent: Jun. 14, 2011

(54) DATA PROCESSING APPARATUS, METHOD OF CONTROLLING DATA PROCESSING APPARATUS, AND COMPUTER-READABLE STORAGE MEDIUM FOR USE IN CONTROLLING IMAGE SENSING PROCESSING AND IMAGE PROCESSING

(75) Inventor: Ikuo Niimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/132,305

(22) Filed: Jun. 3, 2008

(65) Prior Publication Data
US 2008/0297618 A1 Dec. 4, 2008

(30) Foreign Application Priority Data

Jun. 4, 2007 (JP) ................. 2007-148623

(51) Int. Cl.
*H04N 5/228* (2006.01)
*H04N 5/222* (2006.01)

(52) U.S. Cl. .............. 348/222.1; 348/224.1; 348/333.02
(58) Field of Classification Search ................ 348/222.1
See application file for complete search history.

(56) References Cited

U.S. PATENT DOCUMENTS

| 7,649,553 B2 * | 1/2010 | Wakabayashi ............. 348/223.1 |
| 7,825,962 B2 * | 11/2010 | Nakajima et al. .......... 348/231.6 |
| 2002/0167592 A1 * | 11/2002 | Toyoda et al. ............. 348/207.1 |
| 2004/0119841 A1 * | 6/2004 | Shimizu ..................... 348/222.1 |
| 2005/0270381 A1 * | 12/2005 | Owens et al. .............. 348/222.1 |
| 2006/0045381 A1 * | 3/2006 | Matsuo et al. ................ 382/276 |
| 2007/0177023 A1 * | 8/2007 | Beuhler et al. ............. 348/211.3 |

FOREIGN PATENT DOCUMENTS

JP  2005-026971 A  1/2005

* cited by examiner

*Primary Examiner* — Ngoc-Yen T Vu
(74) *Attorney, Agent, or Firm* — Canon U.S.A. Inc., I.P. Division

(57) ABSTRACT

The digital camera according to an embodiment executes image sensing processing first, if interruption processing occurs during transfer parameter setting processing. Thus, the user does not miss a photo opportunity.

12 Claims, 22 Drawing Sheets

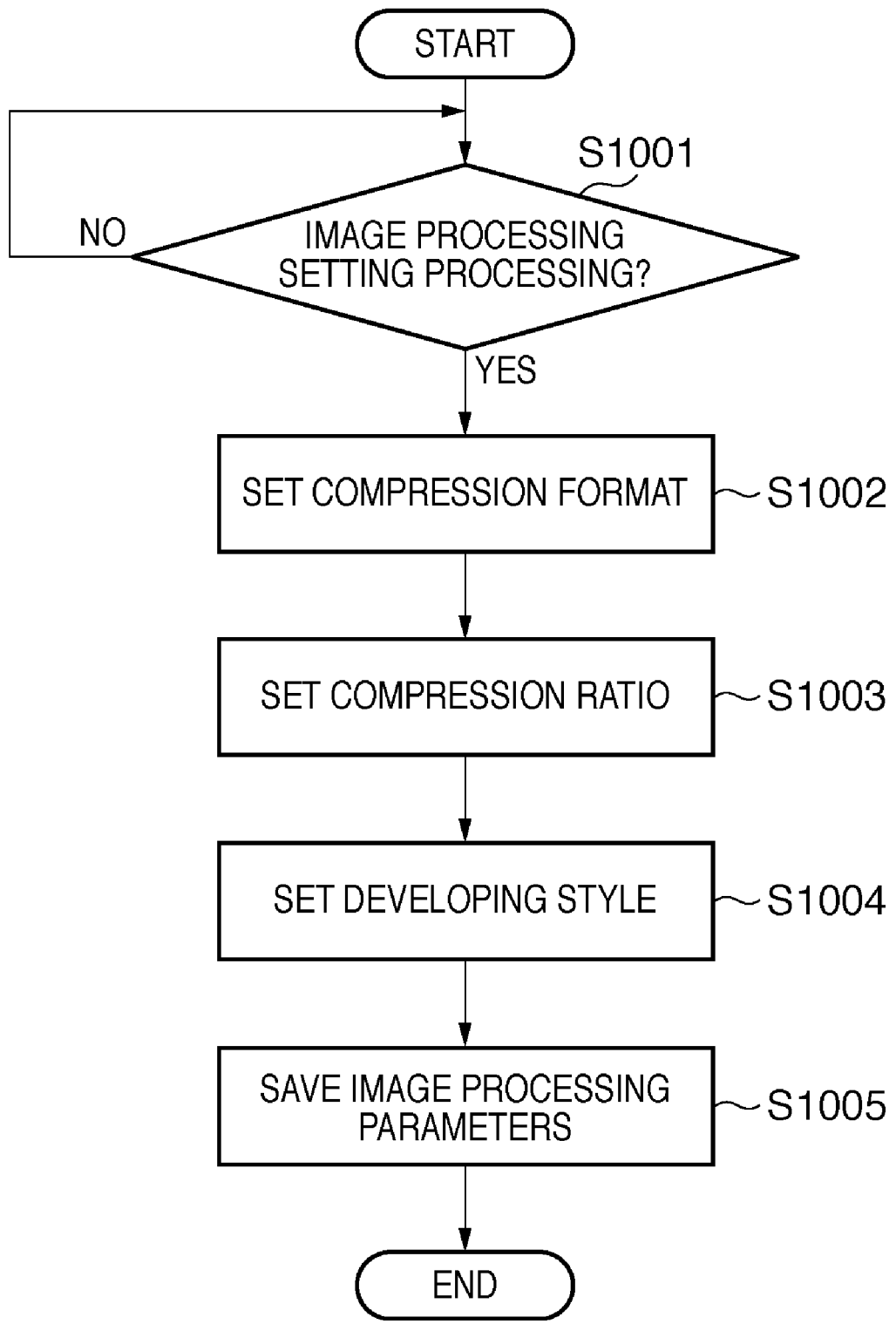

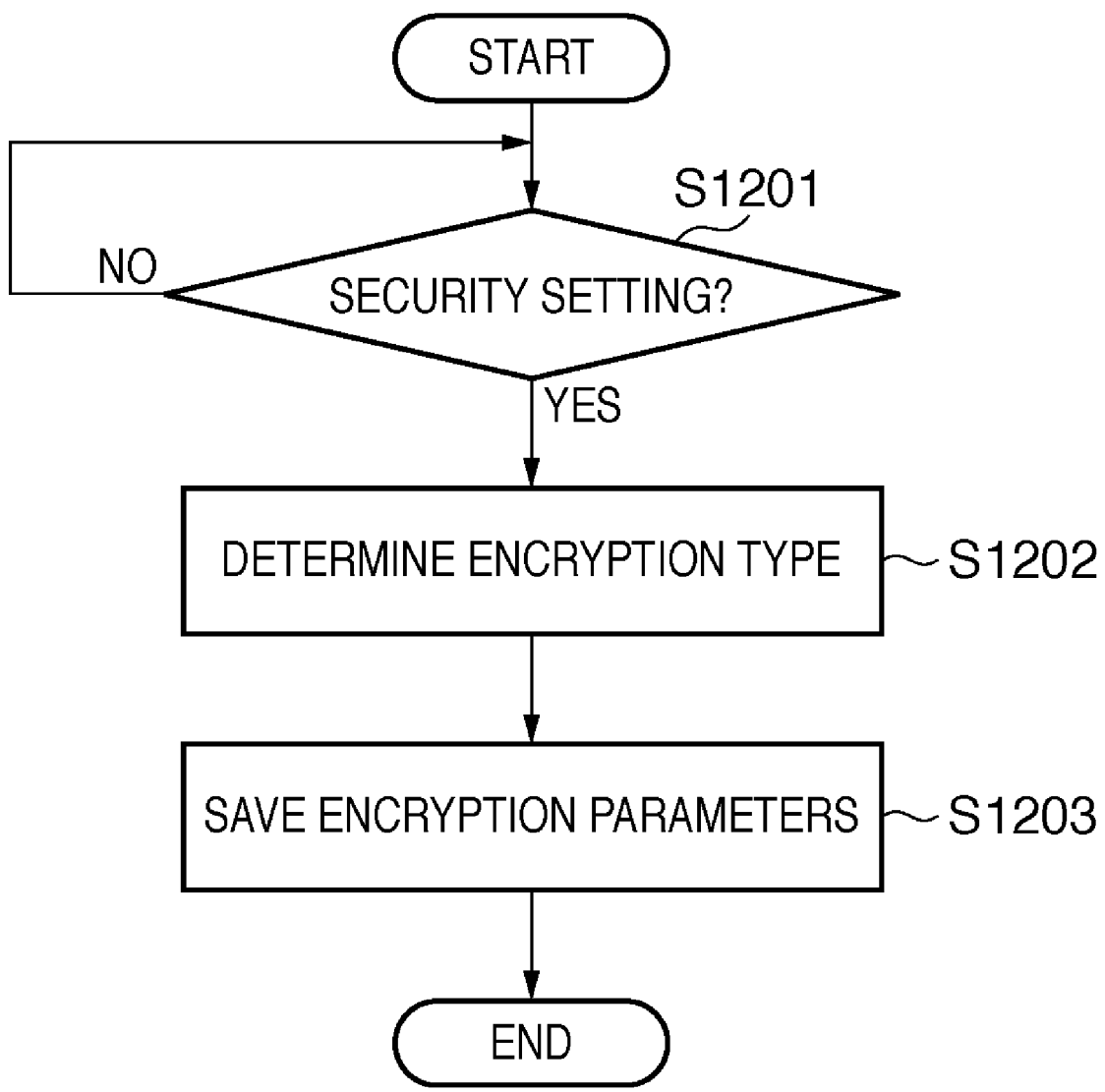

F I G. 15
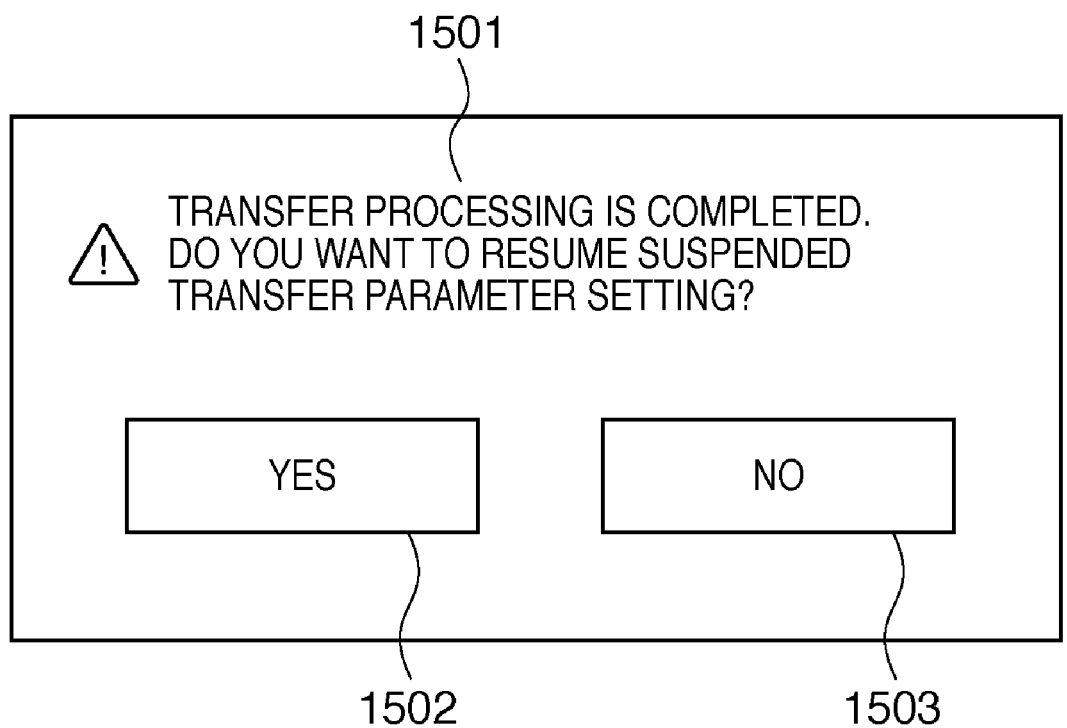

F I G. 17
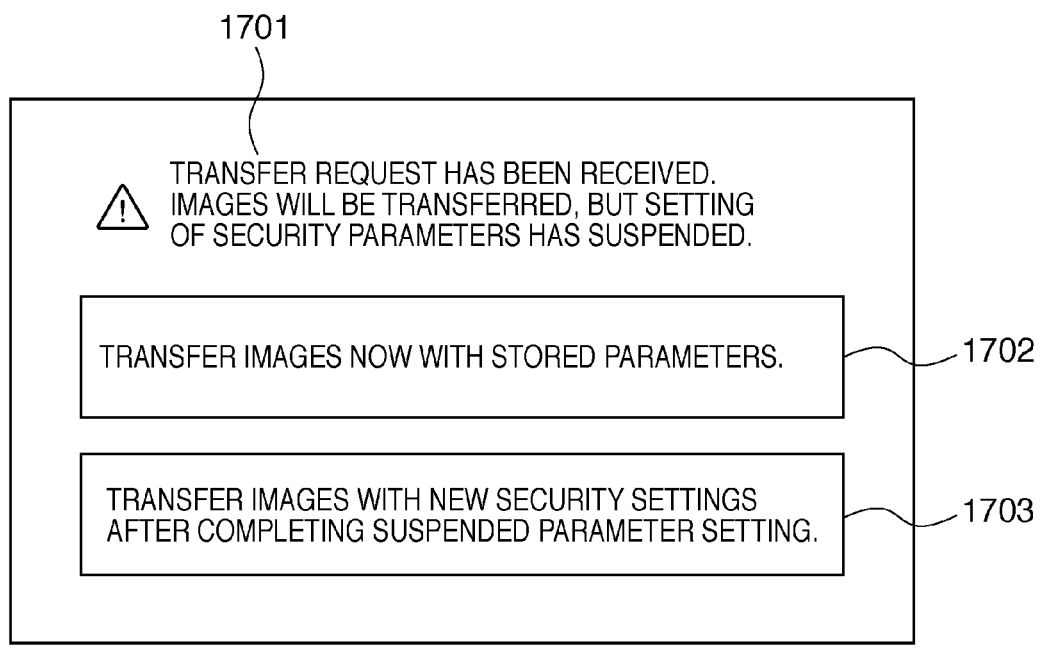

DATA PROCESSING APPARATUS, METHOD OF CONTROLLING DATA PROCESSING APPARATUS, AND COMPUTER-READABLE STORAGE MEDIUM FOR USE IN CONTROLLING IMAGE SENSING PROCESSING AND IMAGE PROCESSING

BACKGROUND OF THE INVENTION

1. Field of the Invention

The present invention relates to a data processing apparatus, a method of controlling the data processing apparatus, and a computer-readable storage medium.

2. Description of the Related Art

A data processing apparatus can execute various processes regarding data handling. A digital camera, which is a kind of data processing apparatus, converts the optical image of an object into an electrical signal by an image sensor such as a CCD sensor or CMOS sensor. The digital camera can convert the electrical signal into digital image data, and store the image data in a removable or internal recording medium such as a semiconductor memory card or hard disk. Unlike a silver halide camera using a film, the digital camera is advantageously almost free from the limitation of the shooting count. Some digital cameras can transfer obtained image data to an external apparatus such as a personal computer or network hard disk by communication via a wired LAN or wireless LAN, as disclosed in Japanese Patent Laid-Open No. 2005-026971.

The digital camera performs developing processing including white balance processing and color interpolating processing for obtained image data, and creates an image file including the image data having undergone the developing processing. The developing processing method for image data can also be set in advance in accordance with user preferences. Further, some cameras can add, to obtained image data, data representing, for example, the result of determining whether the image data has been tampered.

As the number of processing functions for obtained image data increases, the number of items set for these processes also increases.

According to the technique disclosed in Japanese Patent Laid-Open No. 2005-026971, to connect a digital camera to a personal computer, all parameters associated with a series of setting items such as connection account settings need to be set. If even one of the parameters is wrong, the digital camera cannot communicate with a desired connection partner.

The user must set many parameters in the setting processing, and it takes a long time to input all the parameters by the user. If interruption processing such as shooting processing occurs during setting processing, whether to execute the interruption processing may be determined according to the priority of the processing.

However, if a parameter which is being set or is to be set upon interrupting the setting processing is one used in the interruption processing, the user may want to reflect the parameter in the interruption processing. If the user shoots while setting a developing parameter, he may want to develop the obtained image by using the developing parameter, setting of which is not complete. If the user must set a series of setting items (parameters) from the beginning when the setting processing resumes, this may increase the burden of the setting processing on him. As a result, the user request to perform developing processing with new parameters may not be satisfied.

SUMMARY OF THE INVENTION

It is an object of the present invention to perform processing flexibly coping with a user request even upon receiving an instruction to execute interruption processing during parameter setting processing.

According to the first aspect of the present invention, there is provided an image capturing apparatus which has an image sensing unit and a processing unit that executes processing for an image sensed by the image sensing unit, and which can sequentially execute image sensing processing by the image sensing unit and processing by the processing unit in accordance with an image sensing instruction, the apparatus comprising: a first storage unit adapted to store a parameter associated with the processing by the processing unit; a setting unit adapted to set the parameter to be stored in the first storage unit; and a control unit adapted to, if the image sensing instruction is issued during parameter setting processing by the setting unit, control to execute the image sensing processing by the image sensing unit before completion of the parameter setting processing, and then to execute the processing by the processing unit for the image sensed by the image sensing unit using the parameter set by the setting unit upon completion of executing the parameter setting processing by the setting unit.

According to the second aspect of the present invention, there is provided a method of controlling an image capturing apparatus which has an image sensing unit and a processing unit that executes processing for an image sensed by the image sensing unit, and which can sequentially execute image sensing processing by the image sensing unit and processing by the processing unit in accordance with an image sensing instruction, the method comprising: storing a parameter associated with the processing by the processing unit; setting the parameter to be stored in the storing; and controlling, if the image sensing instruction is issued during parameter setting processing in the setting, to execute the image sensing processing by the image sensing unit before completion of the parameter setting processing in the setting, and then to execute the processing by the processing unit for the image sensed by the image sensing unit using the parameter set by the setting upon completion of executing the parameter setting processing in the setting.

According to the third aspect of the present invention, there is provided a computer-readable storage medium storing computer-readable instructions, the computer-readable instructions causing a computer to execute the method according to the second aspect of the present invention.

According to the present invention, processing flexibly coping with a user request can be performed even upon receiving an instruction to execute interruption processing during parameter setting processing.

Further features of the present invention will become apparent from the following description of exemplary embodiments with reference to the attached drawings.

BRIEF DESCRIPTION OF THE DRAWINGS

FIG. 10 is a flowchart showing the sequence of processing when interruption processing does not occur during setting processing for setting image processing parameters;

FIG. 12 is a flowchart showing the sequence of processing when interruption processing does not occur during setting processing for setting security parameters;

FIG. 15 is a view showing an example of a window displayed on the digital camera;

FIG. 17 is a view showing an example of a window displayed on the digital camera.

DESCRIPTION OF THE EMBODIMENTS

An embodiment will describe a digital camera as an example of a data processing apparatus. The embodiment is directed to an apparatus which determines, in accordance with the processing content of interruption processing, whether to continue an incomplete part of setting processing after the end of the interruption processing when the interruption processing such as shooting processing occurs during setting processing for predetermined processing. The embodiment is also directed to the control of the apparatus.

Figure 1:
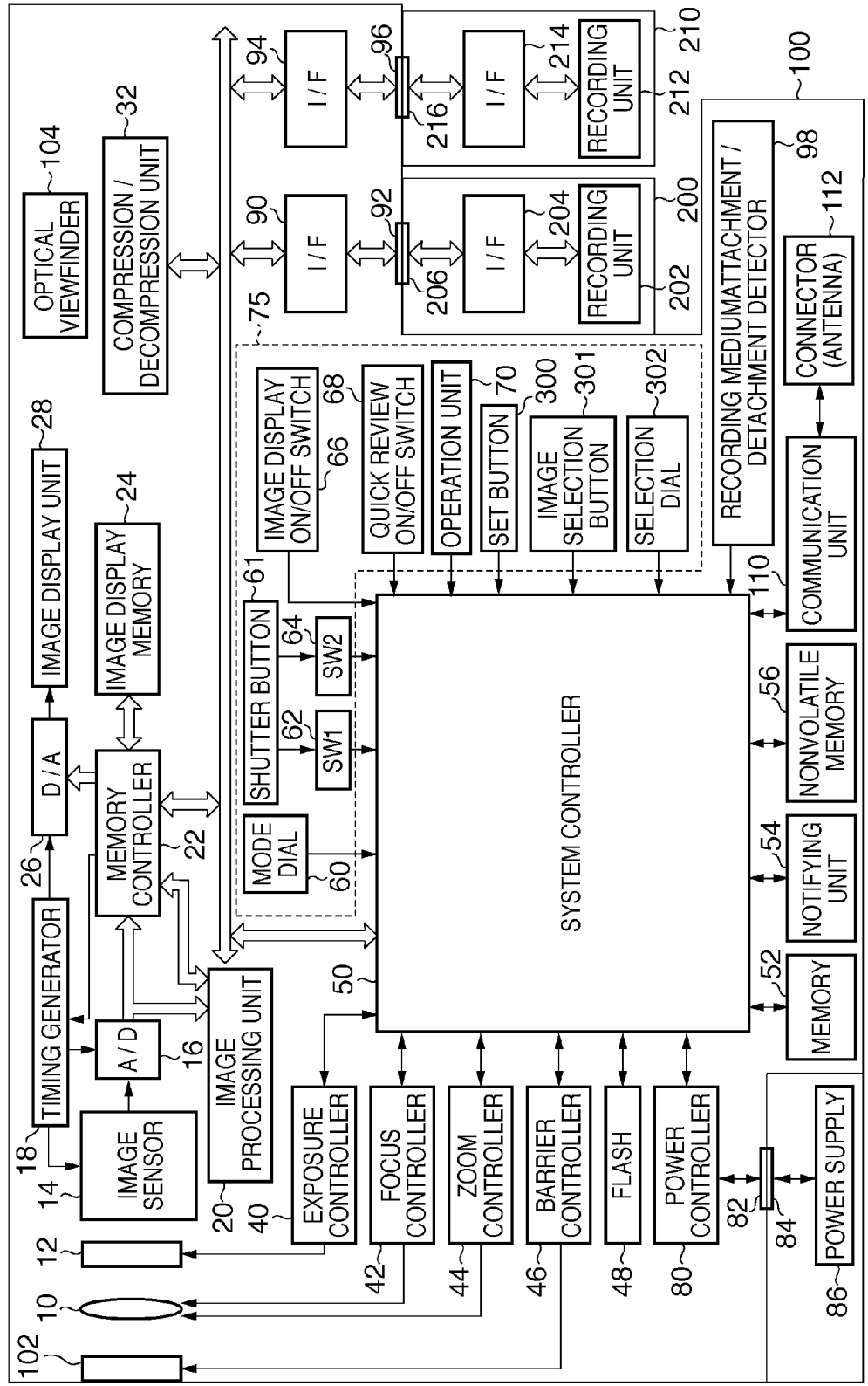
FIG. 1 is a block diagram of a digital camera according to an embodiment of the present invention.

A digital camera 100 according to the embodiment of the present invention will be described with reference to FIG. 1. FIG. 1 is a block diagram of the digital camera 100 according to the embodiment of the present invention.

The digital camera 100 comprises the following building components.

The digital camera 100 comprises a photographing lens 10.

A shutter 12 has a stop function.

An image sensor 14 converts the optical image of an object into an electrical signal. In other words, the image sensor 14 senses an object to acquire an image signal (analog image signal).

An A/D converter 16 converts an analog image signal output from the image sensor 14 into a digital image signal.

A timing generator 18 supplies a clock signal and control signal to the image sensor 14, the A/D converter 16, and a D/A converter 26 (to be described later). The timing generator 18 is controlled by a memory controller 22 and system controller 50 (to be described later).

An image processing unit 20 receives a digital image signal from the A/D converter 16 or the memory controller 22 (to be described later). The image processing unit 20 performs predetermined pixel interpolating processing and color conversion processing for the digital image signal, generating image data. The image processing unit 20 executes predetermined arithmetic processing using image data, and supplies the arithmetic result to the system controller 50 (to be described later).

The memory controller 22 controls the A/D converter 16, timing generator 18, and image processing unit 20. The memory controller 22 also controls an image display memory 24, the D/A converter 26, a memory 52, and a compression/decompression unit 32 (to be described later). When receiving a digital image signal from the A/D converter 16, the memory controller 22 supplies it to the image processing unit 20 or writes it in the image display memory 24 or memory 52 (to be described later).

The digital camera 100 comprises the image display memory 24.

The digital camera 100 further comprises the D/A converter 26.

An image display unit 28 includes a TFT LCD and the like. The image display unit 28 receives, from the D/A converter 26, an analog image signal prepared by D/A-converting display image data written in the image display memory 24. The image display unit 28 displays an image corresponding to the analog image signal. The image display unit 28 can implement an electronic viewfinder function by sequentially displaying images corresponding to image signals obtained by the image sensor 14. The image display unit 28 can arbitrarily turn on/off the display in accordance with an instruction from the system controller 50 (to be described later). By turning off the display, the power consumption of the digital camera 100 can be greatly reduced.

The compression/decompression unit 32 compresses/decompresses image data by adaptive discrete cosine transform (ADCT) or the like. The compression/decompression unit 32 reads an image stored in the memory 52, compresses or decompresses it, and writes the processed data in the memory 52.

An exposure controller 40 controls the shutter 12 having the stop function. The exposure controller 40 can also implement even a flash control function in cooperation with a flash 48 (to be described later).

A focus controller 42 controls focusing of the photographing lens 10.

The system controller 50 controls the exposure controller 40 and focus controller 42 by the TTL method. The system controller 50 controls the exposure controller 40 and focus controller 42 based on the result of calculating a digital image signal by the image processing unit 20.

A zoom controller 44 controls zooming of the photographing lens 10.

A barrier controller 46 controls the operation of a protector 102 serving as a barrier.

The flash 48 can implement an AF auxiliary light projecting function, flash control function, and the like.

The system controller 50 controls the respective units of the digital camera 100. For example, the system controller 50 receives the arithmetic result of a digital image signal from the image processing unit 20. Based on the arithmetic result, the system controller 50 controls the exposure controller 40 or focus controller 42, and performs TTL (Through The Lens)

AF (Auto Focus) processing, AE (Auto Exposure) processing, and EF (Electronic Flash pre-emission) processing. Also based on the arithmetic result, the system controller 50 performs TTL AWB (Auto White Balance) processing.

The system controller 50 executes setting processing for setting parameters associated with processing performed by the digital camera 100. In the setting processing, the system controller 50 can set, for example, parameters for transferring data from the digital camera 100 to an external apparatus.

The system controller 50 controls interruption processing. For example, the digital camera 100 according to the embodiment gives a higher priority order to shooting processing than the above-mentioned parameter setting processing. When receiving a shooting instruction from the user during the setting processing, the system controller 50 temporarily stops the setting processing and performs the shooting processing. That is, the system controller 50 performs processing of interrupting the setting processing with the shooting processing.

The interruption processing is not always one processing, and may include a plurality of processes (first processing and second processing). For example, when the interruption processing is shooting processing, processing (first processing) of sensing an object image may be accompanied by transfer processing (second processing) of transferring, for example, image data to an external apparatus. Also, image sensing processing (first processing) may be accompanied by encryption processing (second processing) of encrypting image data. Image sensing processing (first processing) may be accompanied by developing processing such as color processing or compression processing (second processing) for image data.

The memory 52 temporarily stores various data. The memory (first and second storage units) 52 can store suspension information representing a parameter, setting of which is not complete when setting processing suspends due to interruption processing. The suspension information includes information for identifying a parameter, setting of which is not complete upon suspension, and a parameter value which has already been set when the setting processing suspends.

It should be noted that the suspension information may include information representing whether each of parameters has been set, instead of the information for identifying a parameter, setting of which is not complete.

A notifying unit 54 notifies predetermined information. One or a plurality of notifying units 54 are attached to easy-to-see positions near the operation unit of the digital camera 100. For example, the notifying unit 54 displays a warning that setting processing has suspended. As described above, the setting processing is to prompt the user to set a plurality of parameters associated with predetermined processing. Also, the notifying unit 54 displays an operating state, message, or the like using characters, an image, or the like via a liquid crystal display (LCD), LED, optical viewfinder 104, and the like in accordance with execution of a program by the system controller 50. Further, the notifying unit 54 outputs an operating state, message, or the like by sound via a loudspeaker or the like.

The notifying unit 54 displays, via the LCD or the like, information on the single shooting/continuous shooting display, self-timer display, compression ratio display, recording pixel count display, recording count display, remaining shootable count display, shutter speed display, aperture value display, and exposure correction display. In addition, the notifying unit 54 displays, via the LCD or the like, information on the flash display, red-eye reduction display, macro shooting display, buzzer setting display, remaining timepiece battery level display, remaining battery level display, error display, and multiple-digit figure information display. The notifying unit 54 displays, via the LCD or the like, information on the attaching/detaching states of recording media 200 and 210, communication I/F operation display, and date/time display.

The notifying unit 54 displays, via the optical viewfinder 104, information on the in-focus display, camera shake warning display, flash charge display, shutter speed display, aperture value display, and exposure correction display.

It should be noted that content notified by the notifying unit 54 may also be displayed on the image display unit 28.

An electrically erasable/recordable nonvolatile memory 56 is, for example, EEPROM. The nonvolatile memory (first and second storage units) 56 stores constants, variables, programs, and the like for the operation of the system controller 50. In the embodiment, the parameters of various processes are stored in advance in the nonvolatile memory 56, and the stored parameters are set again by performing setting processing.

It should be noted that, although in the following description, the memory 52 is used as a temporary storage unit like a buffer, the nonvolatile memory 56 may also serve as a buffer.

An input unit 75 is an operation unit for inputting various operation instructions to the system controller 50. The input unit 75 accepts a predetermined instruction via one or a combination of a switch, dial, touch panel, pointing based on line-of-sight detection, audio recognition device, and the like. The input unit 75 includes the following components 60, 61, 62, 64, 66, 70, 300, 301, and 302.

The mode dial switch 60 accepts an instruction to switch and set function modes such as power-off, auto shooting mode, shooting mode, panoramic shooting mode, playback mode, multi-window playback/erase mode, and PC connection mode.

The shutter button 61 accepts an instruction from the user to shoot a still image. For example, when pressed halfway, the shutter button 61 accepts the first instruction to execute AF (Auto Focus) processing, AE (Auto Exposure) processing, AWB (Auto White Balance) processing, EF (Electronic Flash pre-emission) processing, or the like. For example, when pressed fully, the shutter button 61 accepts the second instruction to, for example, shoot a still image.

When receiving the first instruction from the shutter button 61, the first shutter switch (SW1) 62 is turned on, and supplies, to the system controller 50, information representing that the first shutter switch 62 is ON. In response to the fact that the first shutter switch 62 is ON, the system controller 50 instructs each unit to start the operation of AF (Auto Focus) processing, AE (Auto Exposure) processing, AWB (Auto White Balance) processing, EF (Electronic Flash pre-emission) processing, or the like.

When receiving the second instruction from the shutter button 61, the second shutter switch (SW2) 64 is turned on, and supplies, to the system controller 50, information representing that the second shutter switch 64 is ON. Then, the system controller 50 designates the start of the operation of a series of shooting processes. In the series of shooting processes, the system controller 50 performs exposure processing and developing processing. In the exposure processing, the system controller 50 writes a signal read out from the image sensor 14 as image data in the memory 52 via the A/D converter 16 and memory controller 22. In the developing processing, the system controller 50 utilizes calculations by the image processing unit 20 and memory controller 22. In the series of shooting processes, the system controller 50 also performs recording processing. In the recording processing, the system controller 50 reads out image data from the memory 52, compresses it by the compression/decompression unit 32, and writes it in the recording medium 200 or 210.

The image display ON/OFF switch 66 accepts an instruction to set the ON/OFF state of the image display unit 28. In accordance with this instruction, the system controller 50 can save power by stopping the current supply to the image display unit 28 when shooting via the optical viewfinder 104.

A quick review ON/OFF switch 68 accepts an instruction to set a quick review function of automatically playing back image data obtained immediately after shooting. In the embodiment, particularly, the quick review ON/OFF switch 68 can accept the setting of the quick review function when the image display unit 28 is OFF.

The set button 300 can be assigned an arbitrary one of camera functions. The set button 300 accepts an instruction to enable the assigned function. For example, a function of displaying a predetermined item of the setup menu on the notifying unit 54 is assigned to the set button 300. In this case, when pressed, the set button 300 accepts an instruction to enable the function of display on the notifying unit 54, and supplies the instruction to the system controller 50. Then, the system controller 50 displays the predetermined item of the setup menu on the notifying unit 54. It is also possible to assign the set button 300 a function of selecting a quickly reviewed image upon shooting as an image to be transferred to a personal computer or the like. At this time, when pressed, the set button 300 accepts an instruction to select a quickly reviewed image as an image to be transferred, and supplies the instruction to the system controller 50. The system controller 50 performs transfer processing of reading out image data corresponding to the selected image from the memory 52 or the like, and transferring the image data to an external apparatus via a communication unit 110 and connector 112.

When pressed, the image selection button 301 accepts an instruction to enter the image selection mode, and supplies the instruction to the system controller 50. Then, the system controller 50 displays an image corresponding to the image selection mode on the image display unit 28.

When turned, the selection dial 302 accepts an instruction to select one of images displayed on the image display unit 28, and supplies the instruction to the system controller 50. The system controller 50 can performs predetermined processing for the selected image.

The operation unit 70 comprises various buttons, a touch panel, and the like. The operation unit 70 includes a menu button, macro button, multi-window playback/page feed button, flash setting button, single shooting/continuous shooting/self-timer switching button, menu forward (+) feed button, and menu reverse (−) feed button. The operation unit 70 also includes a playback image forward (+) feed button, playback image reverse (−) feed button, shooting quality selection button, exposure correction button, date/time setting button, and bracket mode selection button.

The power controller 80 includes a battery detector, a DC-DC converter, and a switching circuit for switching between blocks to be energized. The power controller 80 detects attachment/detachment of a battery, the type of battery, and the remaining battery level. The power controller 80 controls the DC-DC converter based on the detection results and an instruction from the system controller 50. The power controller 80 applies a necessary voltage to respective units including the recording medium for a necessary period.

The connector 82 is on the side of the power controller.
The connector 84 is on the side of the power supply.

A power supply 86 is a primary battery (e.g., an alkaline battery or lithium battery), a secondary battery (e.g., an NiCd battery, NiMH battery, or Li battery), an AC adapter, or the like.

An interface 90 interfaces the digital camera 100 with the recording medium 200 such as a memory card or hard disk. By using the interface 90, the digital camera 100 can access the recording medium 200. The recording medium 200 is, for example, a memory card or hard disk. The recording medium 200 comprises a recording unit 202 made up of a semiconductor memory, magnetic disk, or the like, an interface 204 with the digital camera 100, and a connector 206 for connecting the recording medium 200 to the digital camera 100.

A connector 92 connects the digital camera 100 to the recording medium 200 such as a memory card or hard disk.

An interface 94 interfaces the digital camera 100 with the recording medium 210 such as a memory card or hard disk. By using the interface 94, the digital camera 100 can access the recording medium 210. The recording medium 210 is, for example, a memory card or hard disk. The recording medium 210 comprises a recording unit 212 made up of a semiconductor memory, magnetic disk, or the like, an interface 214 with the digital camera 100, and a connector 216 for connecting the recording medium 210 to the digital camera 100.

A connector 96 connects the digital camera 100 to the recording medium 210 such as a memory card or hard disk.

It should be noted that two interfaces and two connectors for attaching a recording medium may also be replaced with one interface and one connector, or three or more interfaces and three or more connectors. Interfaces and connectors of different standards may also be combined. It is also possible to adopt interfaces and connectors compliant with the standard of a semiconductor memory card or the like. In this case, by connecting various communication cards, image data and management information attached to it can be transferred between the digital camera 100 and a peripheral device such as a computer or printer. The communication cards are, for example, a LAN card, modem card, USB card, IEEE1394 card, P1284 card, SCSI card, and PHS card.

A recording medium attachment/detachment detector 98 detects whether the recording media 200 and 210 are respectively attached to the connectors 92 and 96.

The protector 102 is a barrier which covers the photographing lens 10 and image sensor 14 and protects them from dirt and damage.

By using the optical viewfinder 104, the user can take a picture without using the electronic viewfinder function provided by the image display unit 28. The optical viewfinder 104 displays some pieces of information displayed by the notifying unit 54, for example, information on the focusing display, camera shake warning display, flash charge display, shutter speed display, aperture value display, and exposure correction display.

The communication unit 110 has various communication functions pursuant to RS232C, USB, IEEE1394, P1284, SCSI, modem, LAN, and wireless communication.

The connector 112 connects the digital camera 100 to another device via the communication unit 110. The connector 112 also functions as an antenna for wireless communication.

Figure 2:
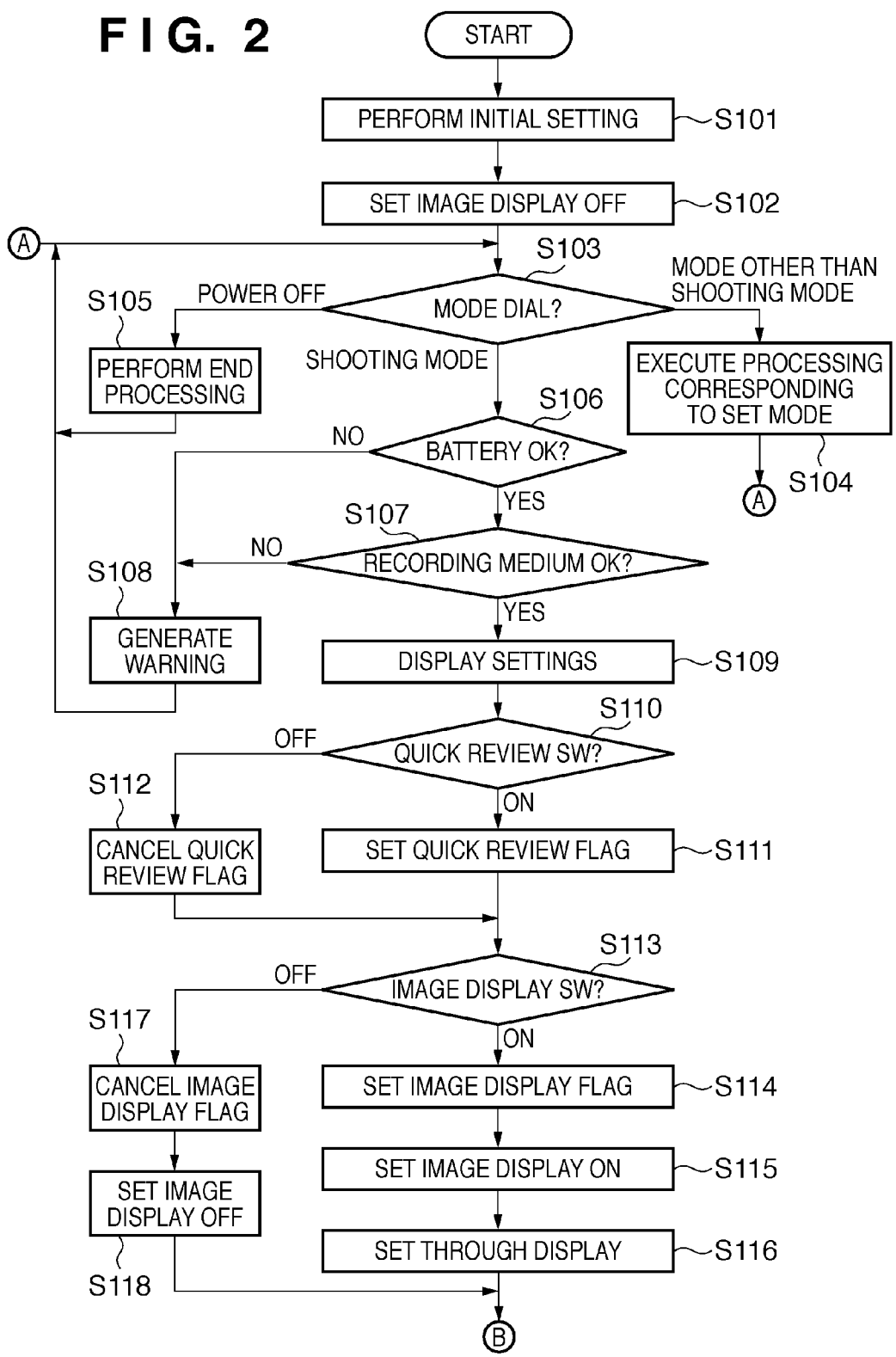
FIG. 2 is a flowchart showing the sequence of a main routine.
Figure 3A:
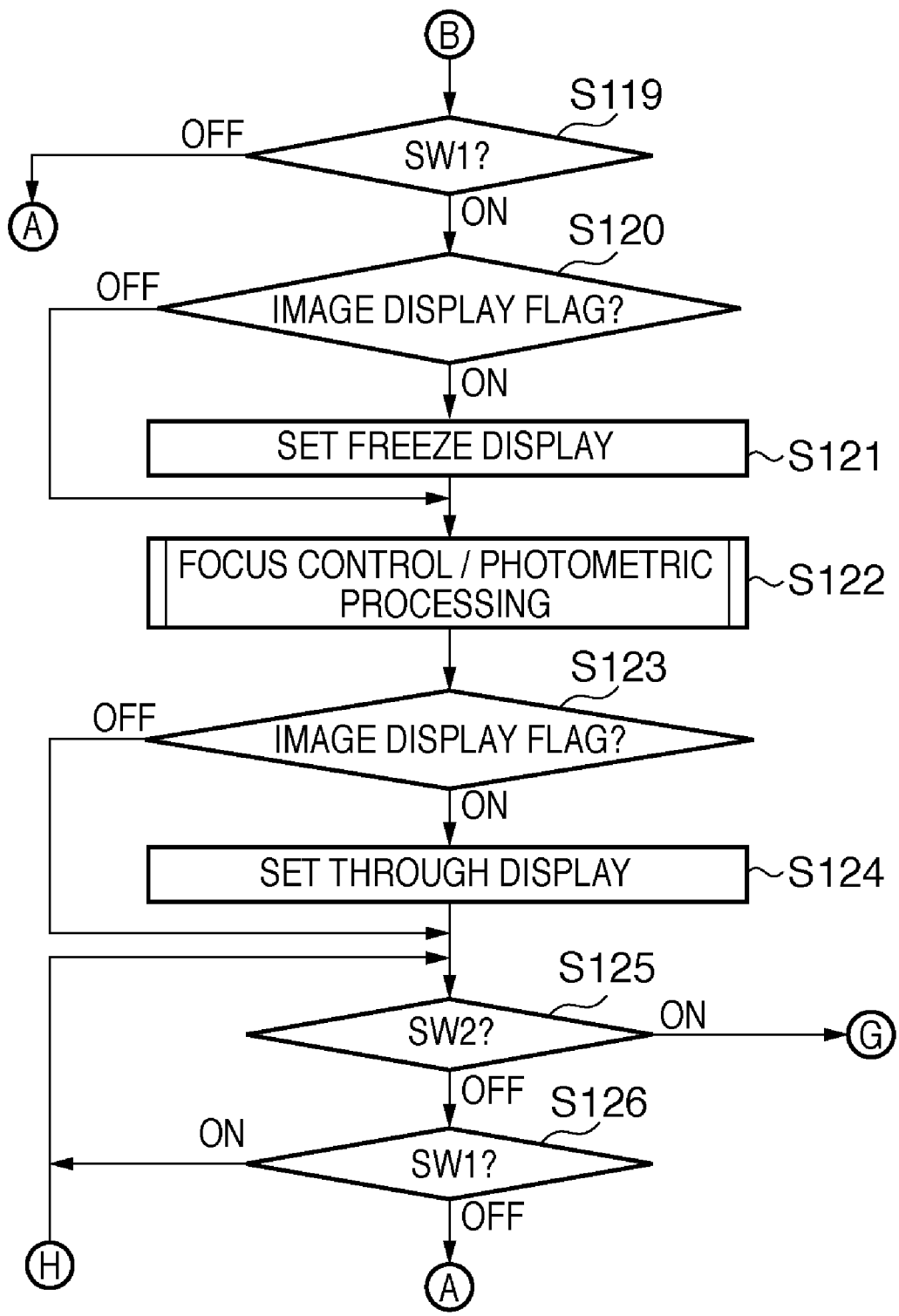
FIGS. 3A and 3B are flowcharts showing the sequence of the main routine.
Figure 3B:
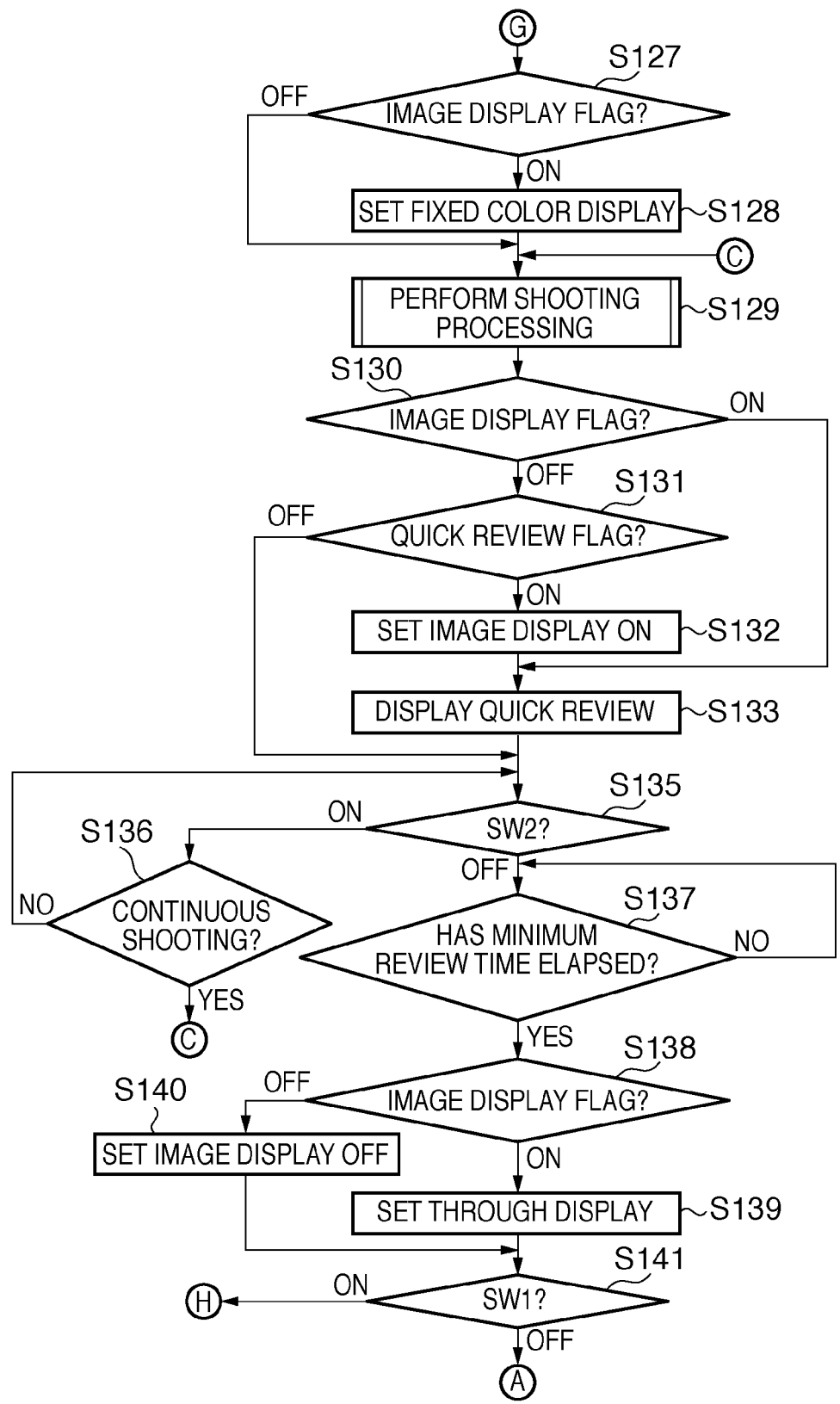

The sequence of normal processing in the digital camera 100 will be explained with reference to FIGS. 2 and 3. FIGS. 2, 3A and 3B are flowcharts showing the sequence of normal processing.

When the digital camera 100 is turned on by, for example, exchanging the battery, the system controller 50 initializes flags, control variables, and the like (step S101), and initializes the image display of the image display unit 28 to OFF (step S102).

The system controller 50 determines the set position of the mode dial 60. If the system controller 50 determines that the mode dial 60 is set to power-off (step S103), it executes end processing (step S105). More specifically, the system controller 50 changes the display of each display unit (image display unit 28, notifying unit 54, and the like) to the end state, and closes the barrier of the protector 102. The system controller 50 stores necessary parameters, setting values, and setting mode including flags and control variables in the nonvolatile memory 56. Upon receiving an instruction from the power controller 80, the system controller 50 performs end processing of, for example, stopping unnecessary power supply to the respective units of the digital camera 100 including the image display unit 28 (step S105). Then, the system controller 50 returns the process to step S103.

If the system controller 50 determines that the mode dial 60 is set to a mode other than the shooting mode (step S103), it executes processing corresponding to the set mode (step S104). After the end of the processing, the system controller 50 returns the process to step S103 (A).

If the system controller 50 determines that the mode dial 60 is set to the shooting mode (step S103), it further determines, via the power controller 80, whether the remaining capacity and operating state of the power supply 86 made up of a battery or the like are proper (YES in step S106). If the system controller 50 determines that the remaining capacity and operating state of the power supply 86 are not proper (NO in step S106), it displays a predetermined warning and outputs a warning beep by an image and sound using the notifying unit 54 (step S108). Then, the system controller 50 returns the process to step S103.

If the system controller 50 determines that the power supply 86 is proper (YES in step S106), it determines whether the operating states of the recording media 200 and 210, particularly the image data recording/playback operation to the recording media 200 and 210 is proper (step S107). If the system controller 50 determines that the operating states of the recording media 200 and 210 are not proper (NO in step S107), it displays a predetermined warning and outputs a warning beep by an image and sound using the notifying unit 54 (step S108). Then, the system controller 50 returns the process to step S103.

If the system controller 50 determines that the operating states of the recording media 200 and 210 are proper (YES in step S107), it displays and outputs various setting states of the digital camera 100 by an image and sound using the notifying unit 54 (step S109).

If the image display of the image display unit 28 is ON, the system controller 50 displays various setting states of the digital camera 100 by an image also using the image display unit 28.

The system controller 50 checks the setting state of the quick review ON/OFF switch 68. If the system controller 50 determines that the quick review is set ON (step S110), it sets the quick review flag (step S111). If the system controller 50 determines that the quick review is set OFF (step S110), it cancels the quick review flag (step S112).

In steps S111 and S112, the system controller 50 stores the state of the quick review flag in the nonvolatile memory 56 or memory 52. This also applies to other flags (to be described later).

After that, the system controller 50 checks the setting state of the image display ON/OFF switch 66. If the system controller 50 determines that the image display is set ON (step S113), it sets the image display flag (step S114). The system controller 50 sets ON the image display of the image display unit 28 (step S115), and further sets a through display mode in which obtained image data are sequentially displayed (step S116). Then, the system controller 50 advances the process to step S119 (B).

In step S116, the system controller 50 sequentially writes image data in the image display memory 24 via the image sensor 14, A/D converter 16, image processing unit 20, and memory controller 22. The system controller 50 sequentially reads out the image data from the image display memory 24 via the memory controller 22. The system controller 50 sequentially displays images corresponding to the image data on the image display unit 28 via the D/A converter 26, thereby implementing the electronic viewfinder function.

If the system controller 50 determines that the image display ON/OFF switch 66 is set OFF (step S113), it cancels the image display flag (step S117). The system controller 50 sets OFF the image display of the image display unit 28 (step S118), and advances the process to step S119 (B).

If the image display of the image display unit 28 is set OFF in step S118, shooting is done using the optical viewfinder 104 without using the electronic viewfinder function provided by the image display unit 28. In this case, the power consumption by the image display unit 28 and D/A converter 26 which consume a large amount of power can be reduced.

If the system controller 50 determines that the first shutter switch (SW1) 62 is OFF (step S119), it returns the process to step S103.

If the system controller 50 determines that the first shutter switch (SW1) 62 is ON (step S119), it determines the state of the image display flag stored in the internal memory of the system controller 50 or the memory 52 (step S120). If the system controller 50 determines that the image display flag is set (ON), it sets the display state of the image display unit 28 to a freeze display state (step S121), and advances the process to step S122.

If the image display of the image display unit 28 is set to the freeze display state in step S121, the system controller 50 inhibits rewrite of image data in the image display memory 24 via the image sensor 14, A/D converter 16, image processing unit 20, and memory controller 22. The system controller 50 displays a frozen image on the electronic viewfinder by displaying, on the image display unit 28 via the memory controller 22 and D/A converter 26, image data written immediately before setting the freeze display state.

If the system controller 50 determines that the image display flag is canceled (OFF) (step S120), it advances the process to step S122.

The system controller 50 performs focus control processing to focus the photographing lens 10 on an object, and performs photometric processing to determine the aperture value and shutter speed (step S122). If necessary in photometric processing, the system controller 50 also sets the flash. Details of focus control/photometric processing S122 will be described with reference to FIG. 4.

After the end of focus control/photometric processing S122, the system controller 50 determines the state of the image display flag stored in the internal memory of the system controller 50 or the memory 52 (step S123). If the system controller 50 determines that the image display flag is set (ON), it sets the display state of the image display unit 28 to the through display (step S124), and advances the process to step S125. Note that the through display in step S124 is identical to that in step S116.

If the system controller 50 determines that the second shutter switch (SW2) 64 is OFF (step S125) and the first shutter switch (SW1) 62 is also OFF (step S126), it returns the process to step S103 (A).

If the system controller 50 determines that the second shutter switch (SW2) 64 is ON (step S125), it determines the state of the image display flag stored in the internal memory of the system controller 50 or the memory 52 (G). If the system controller 50 determines that the image display flag is set (ON) (step S127), it sets the display state of the image display unit 28 to a fixed color display (step S128), and advances the process to step S129.

If the display state of the image display unit 28 is set to the fixed color display in step S128, the system controller 50 executes the following operation. The system controller 50 displays an image of a fixed color on the electronic viewfinder by displaying replaced image data of the fixed color on the image display unit 28 via the memory controller 22 and D/A converter 26.

If the system controller 50 determines that the image display flag is canceled (OFF) (step S127), it advances the process to step S129.

In step S129, the system controller 50 performs shooting processing. In the shooting processing, the system controller 50 performs exposure processing and developing processing. In the exposure processing, the system controller 50 writes a signal read out from the image sensor 14 as image data in the memory 52 via the A/D converter 16 and memory controller 22. In the developing processing, the system controller 50 uses calculations by the image processing unit 20 and memory controller 22. In the shooting processing, the system controller 50 also performs recording processing. In the recording processing, the system controller 50 reads out image data from the memory 52, compresses it by the compression/decompression unit 32, and writes it in the recording medium 200 or 210 (step S129). Details of shooting processing S129 will be described with reference to FIG. 5.

The system controller 50 determines the state of the image display flag stored in the internal memory of the system controller 50 or the memory 52. If the system controller 50 determines that the image display flag is set (ON) (step S130), it displays a quick review (step S133). In this case, the image display unit 28 is always displayed as an electronic viewfinder even during shooting, and a quick review immediately after shooting is also displayed.

If the system controller 50 determines that the image display flag is canceled (OFF) (step S130), it determines the state of the quick review flag stored in the internal memory of the system controller 50 or the memory 52 (step S131). If the system controller 50 determines that the quick review flag is set (ON), it sets ON the image display of the image display unit 28 (step S132), displays a quick review (step S133), and advances the process to step S135.

If the system controller 50 determines that the quick review flag is canceled (OFF) (step S131), it advances the process to step S135.

The system controller 50 determines whether the second shutter switch 64 has been turned on or off. If the system controller 50 determines that the second shutter switch (SW2) 64 has been turned off (step S135), it ends the quick review display (see step S133), and advances the process to step S137. If the system controller 50 determines that the second shutter switch 64 has been turned on, it continues the quick review display, and advances the process to step S136.

The system controller 50 determines whether the user requests continuous shooting processing (step S136). If the system controller 50 determines that the user requests continuous shooting processing (YES in step S136), it returns the process to step S129 (C). If the system controller 50 determines that the user does not request continuous shooting processing (NO in step S136), it returns the process to step S135.

By referring to a timer (not shown), the system controller 50 determines whether a predetermined minimum review time has elapsed. If the system controller 50 determines that no minimum review time has elapsed (NO in step S137), it returns the process to step S137. If the system controller 50 determines that the minimum review time has elapsed (YES in step S137), it determines the state of the image display flag stored in the internal memory of the system controller 50 or the memory 52. If the system controller 50 determines that the image display flag is set (ON) (step S138), it sets the display state of the image display unit 28 to the through display (step S139), and advances the process to step S141. Note that the through display in step S141 is identical to that in step S116.

If the system controller 50 determines that the image display flag is canceled (OFF) (step S138), it sets OFF the image display of the image display unit 28 (step S140), and advances the process to step S141.

If the system controller 50 determines that the first shutter switch (SW1) 62 is OFF (step S141), it returns the process to step S103 (A). If the system controller 50 determines that the first shutter switch (SW1) 62 is ON (step S141), it returns the process to step S125 (H).

Figure 4:
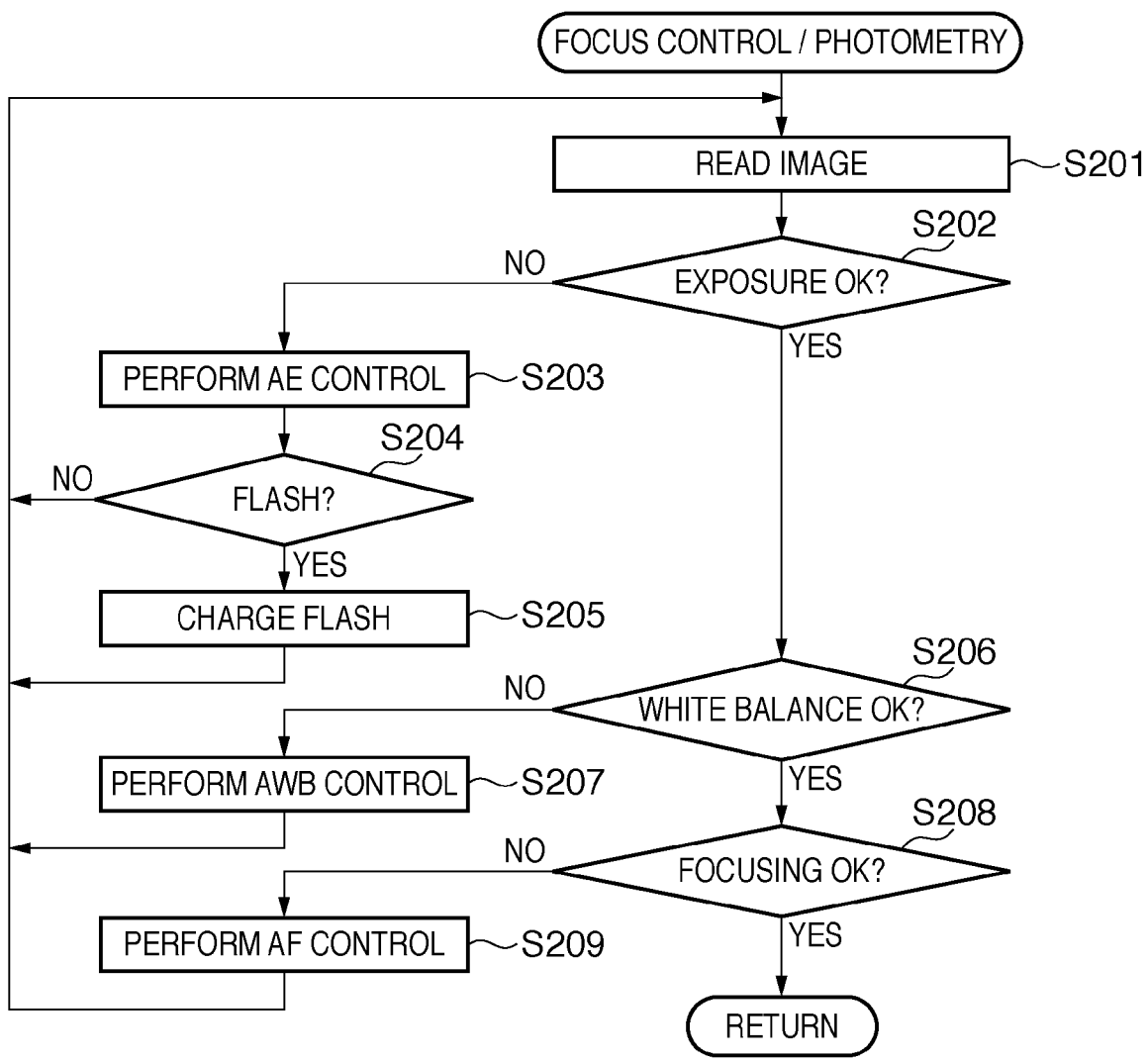
FIG. 4 is a flowchart showing the sequence of focus control/photometric processing.

Details of focus control/photometric processing (S122) will be described with reference to FIG. 4. FIG. 4 is a flowchart showing the sequence of focus control/photometric processing.

The system controller 50 reads out charge signals (analog image signals) from the image sensor 14, and sequentially supplies digital image signals to the image processing unit 20 via the A/D converter 16 (step S201). By using the sequentially supplied digital image signals, the image processing unit 20 executes a predetermined calculation used in TTL (Through The Lens) AE (Auto Exposure) processing, EF (Electronic Flash pre-emission) processing, and AF (Auto Focus) processing.

In each processing, the image processing unit 20 extracts a necessary number of signals from necessary specific pixels out of all pixels after shooting, and uses the extracted signals in calculation. In respective processes such as TTL AE, EF, AWB, and AF, the image processing unit 20 can execute calculations optimum for different modes such as the center-weighted mode, average mode, and evaluation mode.

The system controller 50 performs AE control using the exposure controller 40 (step S203) until it determines, from the calculation result received from the image processing unit 20, that the exposure (AE) is correct (YES in step S202). If the system controller 50 determines that the exposure (AE) is not correct (NO in step S202), it performs AE control.

By using measurement data obtained by AE control, the system controller 50 determines whether the flash is necessary. If the system controller 50 determines that the flash is necessary (YES in step S204), it sets the flash flag and charges the flash 48 (step S205). If the system controller 50 determines that no flash is necessary (NO in step S204), it returns the process to step S201.

If the system controller 50 determines that the exposure (AE) is correct (YES in step S202), it stores at least either of the measurement data and setting parameter in the internal memory of the system controller 50 or the memory 52.

By using the calculation result obtained by the image processing unit 20 and the measurement data obtained by AE control, the system controller 50 determines whether the white balance (AWB) is correct (OK). The system controller 50 adjusts the color processing parameter using the image processing unit 20 and performs AWB control (step S207) until it determines that the white balance (AWB) is correct (YES in step S206). If the system controller 50 determines that the white balance (AWB) is not correct (NO in step S206), it performs AWB control.

If the system controller 50 determines that the white balance (AWB) is correct (YES in step S206), it stores at least either of the measurement data and setting parameter in the internal memory of the system controller 50 or the memory 52.

By using the measurement data obtained by AE control and AWB control, the system controller 50 performs AF control using the focus controller 42 (step S209) until it determines that the object is in focus by focus control (AF) (YES in step S208). If the system controller 50 determines that object is not in focus (NO in step S208), it performs AF control. If the system controller 50 determines that the object is in focus by focus control (AF) (YES in step S208), it stores at least either of the measurement data and setting parameter in the internal memory of the system controller 50 or the memory 52. Then, focus control/photometric processing (S122) ends (returns).

Figure 5:
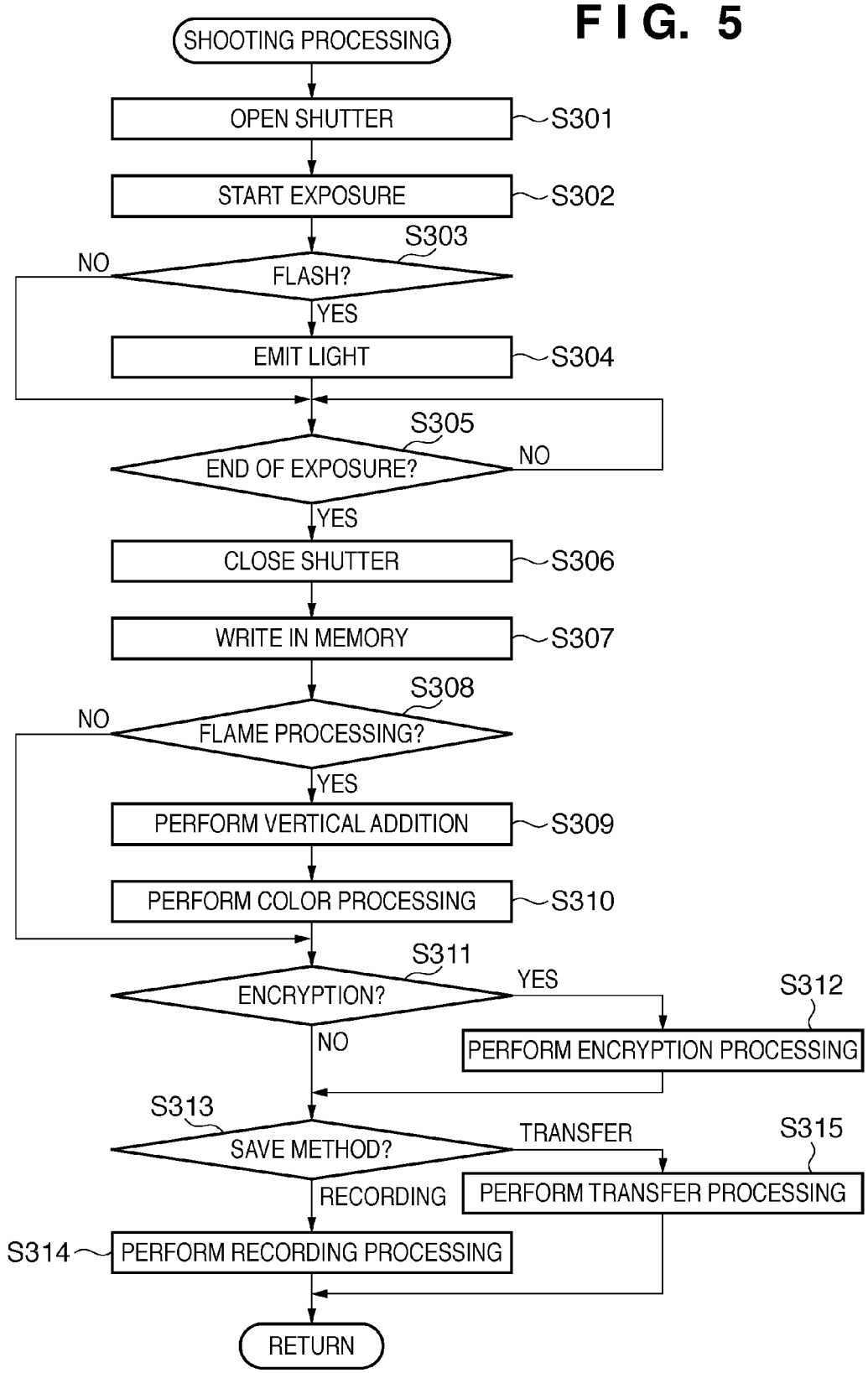
FIG. 5 is a flowchart showing the sequence of shooting processing.

Details of shooting processing (S129) will be explained with reference to FIG. 5. FIG. 5 is a flowchart showing the sequence of shooting processing. In the shooting processing, image sensing processing is executed first, and other processes are executed automatically in accordance with settings subsequently to the image sensing processing.

Based on photometric data stored in the internal memory of the system controller 50 or the memory 52, the system controller 50 opens the shutter 12 having the stop function by the exposure controller 40 in accordance with the aperture value (step S301), and exposes the image sensor 14 (step S302).

The system controller 50 determines, from the flash flag, whether the flash 48 is necessary. If the system controller 50 determines that the flash 48 is necessary (YES in step S303), it causes the flash 48 to emit light (step S304). If the system controller 50 determines that the flash 48 is not necessary (NO in step S303), it advances the process to step S305.

The system controller 50 waits till the end of exposure of the image sensor 14 in accordance with the photometric data (step S305). Then, the system controller 50 closes the shutter 12 (step S306), and reads out a charge signal (analog image signal) from the image sensor 14. The system controller 50 converts the analog image signal into image data by the A/D converter 16, image processing unit 20, and memory controller 22, and writes the image data in the memory 52. Alternatively, the system controller 50 converts the analog image signal into a digital image signal by the A/D converter 16 and memory controller 22, and writes the digital image signal in the memory 52 (step S307). Processing up to this step is image sensing processing of sensing an object. After that, processing corresponding to settings is done.

The system controller 50 performs various image processes in accordance with a set shooting mode. First, the system controller 50 determines whether flame processing needs to be performed. If the system controller 50 determines that flame processing needs to be performed (YES in step S308), it reads out image data written in the memory 52 using the memory controller 22 and, if necessary, the image processing unit 20. The system controller 50 performs vertical addition processing (step S309) and performs color processing (step S310) in accordance with preset image processing parameters. Thereafter, the system controller 50 writes the processed image data in the memory 52. In the image processing, the system controller 50 may also perform processing of, for example, compressing data.

If the system controller 50 determines that no flame processing need be performed (NO in step S308), it advances the process to step S311.

The system controller 50 determines whether to perform encryption processing. If the system controller 50 has not received an encryption instruction from the input unit 75, it determines not to perform encryption processing (NO in step S311), and advances the process to step S313.

If the system controller 50 determines to perform encryption (the system controller 50 has received an encryption instruction from the input unit 75) (YES in step S311), it executes encryption processing. More specifically, the system controller 50 reads out image data from the memory 52, encrypts it in accordance with parameters set in setting processing, and stores the encrypted image data again in the memory 52 (step S312).

The system controller 50 determines an image data save method. The save method includes recording processing and transfer processing. The recording processing is to save image data in the recording medium 200 or 210. The user can select one or both of the recording media 200 and 210 which are to save image data in the recording processing. The user can designate the save method via the input unit 75.

If the system controller 50 determines that the user has selected the recording processing as the save method (step S313), it performs the recording processing. More specifically, the system controller 50 reads out image data from the memory 52, compresses it by the compression/decompression unit 32, and writes the compressed image data in the recording medium 200 or 210. As a result, the image data is saved in the recording medium 200 or 210 (S314).

If the system controller 50 determines that the user has selected the transfer processing as the save method (step S313), it performs the transfer processing. More specifically, the system controller 50 reads out image data from the memory 52, and transfers it to an external apparatus such as a personal computer (PC) via the communication unit 110 and connector 112 in accordance with preset transfer parameters. Accordingly, the image data is saved in the external apparatus (S315).

It should be noted that settings regarding the storage destination and whether to perform encryption may also be made based on a user operation in advance. For example, an encryption mode in which encryption is done, a recording mode in which recording processing is done, and a transfer mode in which transfer processing to an external apparatus is done are prepared. The mode setting is stored in the nonvolatile memory 56. In the processes of steps S311 and S313, the system controller 50 executes processing based on the mode by referring to the current mode. It can also be set to store image data in the recording medium 200 or 210 and transmit it to an external apparatus.

After the end of a series of processes, shooting processing (S129) ends (returns).

Setting processing will be explained. The following setting processing is performed separately from the normal processing shown in FIGS. 2 and 3.

Setting processing for setting parameters (to be referred to as transfer parameters hereinafter) associated with transfer processing will be described.

Figure 6:
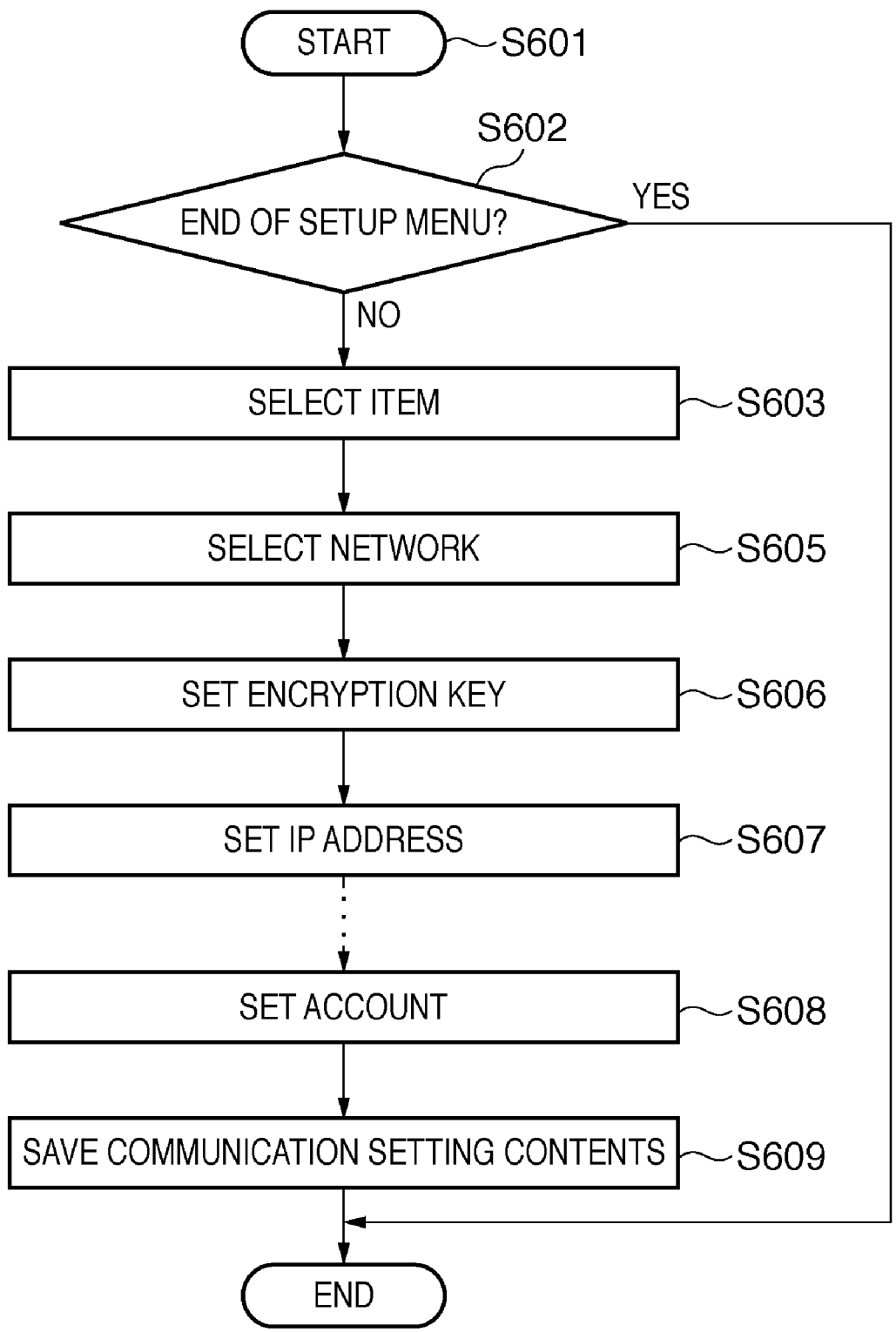
FIG. 6 is a flowchart showing the sequence of processing when interruption processing does not occur during setting processing for setting transfer parameters.

A case where interruption processing does not occur will be explained with reference to FIG. 6. FIG. 6 is a flowchart showing the sequence of processing when interruption processing does not occur during setting processing for setting transfer parameters.

The operation unit 70 accepts a display instruction from the user to display a setup menu for setting parameters, and supplies the instruction to the system controller 50. In response to the display instruction, the system controller 50 displays the setup menu on the notifying unit 54. Then, this sequence starts (step S601). If the system controller 50 determines that it has received an end instruction from the operation unit 70 to end the setup menu (YES in step S602), it ends the processing. If the system controller 50 determines that it has not received any end instruction from the operation unit 70 (NO in step S602), it advances the process to step S603.

The system controller 50 receives an item selection instruction from the selection dial 302 to select a setting item, and receives a finalization instruction from the set button 300 to finalize the selected item. In response to these instructions, the system controller 50 finalizes the setting item (step S603). Note that the setting item selection method many also be another one.

A case where setting of transfer parameters has been selected as a setting item will be exemplified. When setting of transfer parameters is selected, the system controller 50 sequentially sets transfer parameters. The parameter setting processing according to the embodiment adopts a method of setting parameters while changing the window stepwise.

For example, for wireless LAN setting, processing of selecting a network for connecting the digital camera 100 is done in step S605. The system controller 50 scans a network in use via the communication unit 110 and connector 112. The system controller 50 receives the scanning result from the communication unit 110, and displays connectable networks on the notifying unit 54. The user inputs an instruction via the selection dial 302 to select a network, and inputs an instruction via the set button 300 to finalize the selection. The system controller 50 receives the instruction from the selection dial 302 to select the network, and receives the instruction via the set button 300 to finalize the selection. The system controller 50 temporarily stores, in the memory 52, information on the network, selection of which has been finalized, and information detected by scanning.

In step S606, the system controller 50 sets an encryption key for communication via the network selected in step S605. Based on the information detected by scanning, the system controller 50 displays an encryption key setup window on the notifying unit 54. The user inputs an instruction via the selection dial 302 and set button 300 to create an encryption key. The system controller 50 creates an encryption key in accordance with the instruction, and temporarily stores the created encryption key information in the memory 52.

In step S607, the system controller 50 sets an IP address. The system controller 50 displays a window which prompts the user to select an IP address setting method. The IP address setting method includes automatic setting of automatically setting an IP address assigned from a DHCP server, and manual setting of setting an IP address input based on a user operation. The system controller 50 receives an instruction from the input unit 75 to select either automatic setting or manual setting as setting of an IP address. When receiving an instruction to select automatic setting, the system controller 50 acquires IP address information from the DHCP server, and sets it as the IP address of the digital camera 100. When receiving an instruction to select manual setting, the system controller 50 displays an IP address setup window on the notifying unit 54 in accordance with the instruction. The user inputs an instruction via the selection dial 302 and set button 300 to designate an IP address. The system controller 50 creates an IP address in accordance with the instruction. The system controller 50 temporarily stores the IP address information in the memory 52.

A plurality of transfer parameters needs to be set. For example, there are many settings such as transfer destination folder settings and protocol settings. These transfer parameters are also sequentially set based on a user operation.

In step S608, the system controller 50 makes a setting for connecting the digital camera 100 to a communication partner such as an FTP server, for example, an account setting. The system controller 50 receives an instruction from the operation unit 70 to display an account setup window, and displays the account setup menu on the notifying unit 54. After the account setup window is displayed, the user inputs an instruction via the selection dial 302 and set button 300 to designate an account. The system controller 50 creates an account in accordance with the instruction. The system controller 50 temporarily stores the account information in the memory 52.

After the end of setting a series of transfer parameters, the system controller 50 reads out the set parameters from the memory 52 and saves them in the nonvolatile memory 56.

It should be noted that the system controller 50 may also save the transfer parameters at a timing immediately after the end of communication setting, or at a predetermined timing such as a periodic timing.

It should be also noted that the digital camera 100 may communicate with an external device before or after saving transfer parameters in step S609.

Figure 7A:
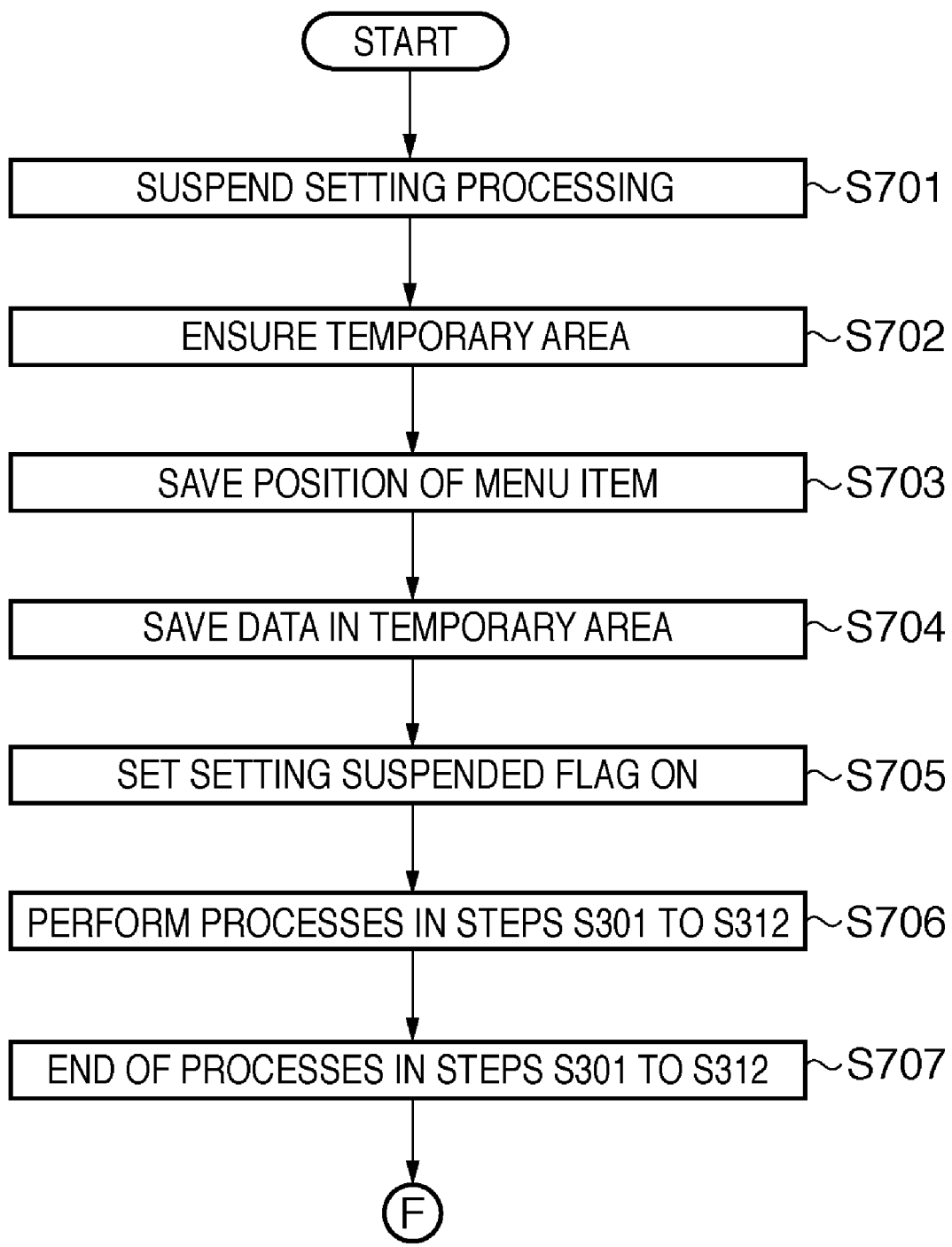
FIGS. 7A and 7B are flowcharts showing the sequence of processing when shooting processing occurs as interruption processing during setting processing for setting transfer parameters.
Figure 7B:
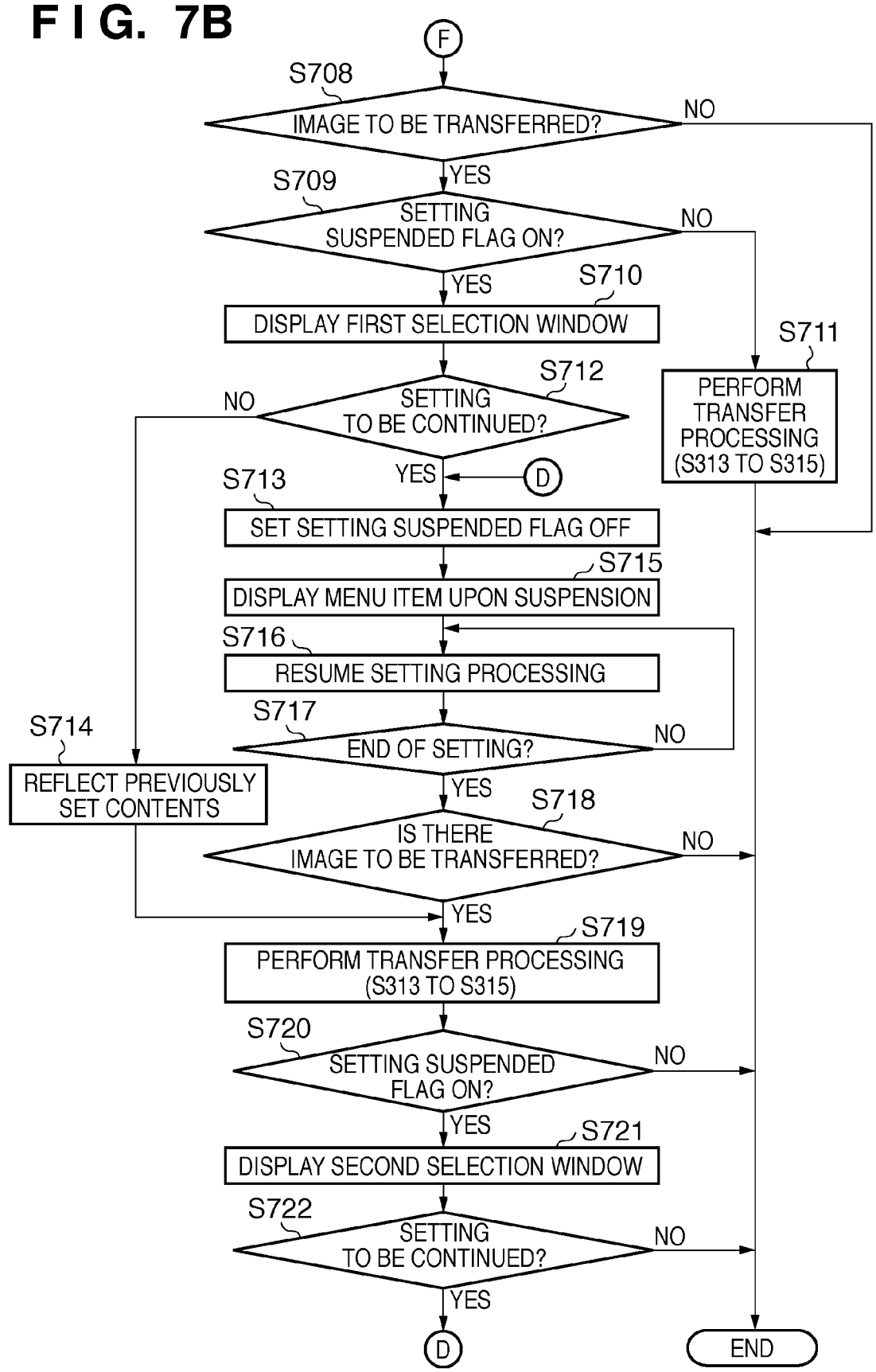

A case where an instruction for shooting processing, which is a kind of interruption processing, is issued during transfer parameter setting processing will be explained with reference to FIGS. 7A and 7B. FIGS. 7A and 7B are flowcharts showing the sequence of processing when an instruction for shooting processing is issued during transfer parameter setting processing (corresponding to steps S605 to S609 shown in FIG. 6).

The sequence shown in FIG. 7A starts when the system controller 50 detects that the user has pressed the shutter button 61 during transfer parameter setting processing.

When the system controller 50 detects that the user has pressed the shutter button 61, it suspends the transfer parameter setting processing (step S701).

Then, the system controller 50 ensures a temporary space in the memory 52 to store a parameter, setting of which is not complete (step S702).

The system controller 50 saves, as suspension information in the memory 52, information for identifying a parameter, setting of which is not complete, for example, information representing the progress of setting processing and the cursor position on the window upon suspension (step S703).

The system controller 50 saves, in the temporary area of the memory 52 that has been ensured in step S702, the parameter value which has already been input when the setting processing suspends (step S704). The system controller 50 sets ON a suspend flag representing that the processing has suspended during setting of transfer parameters (step S705).

It should be noted that the system controller 50 may also automatically save data in the temporary area in each setting step.

The system controller 50 performs image sensing processing, image processing, and encryption processing shown in steps S301 to S312 of FIG. 5 (step S706).

In response to the end of the processes in steps S301 to S312, the system controller 50 advances the process to step S708 (step S707) (F).

In step S708, the system controller 50 determines whether to transfer a sensed image. For example, the system controller 50 determines whether it has received a transfer instruction based on a user operation after shooting, or whether it is set in advance to transfer an image after image sensing. If the system controller 50 determines not to transfer an image (NO in step S708), it ends the process. If the system controller 50 determines to transfer an image (YES in step S708), it determines, by referring to the setting suspended flag, whether the transfer parameter setting processing has suspended. If the system controller 50 determines that transfer parameter setting processing has not suspended (NO in step S709), it performs transfer processing in accordance with transfer parameters stored in the nonvolatile memory 56 (step S711). If the system controller 50 determines that the transfer parameter setting processing has suspended (YES in step S709), it displays the first selection window on the notifying unit 54 (step S710).

Figure 14:
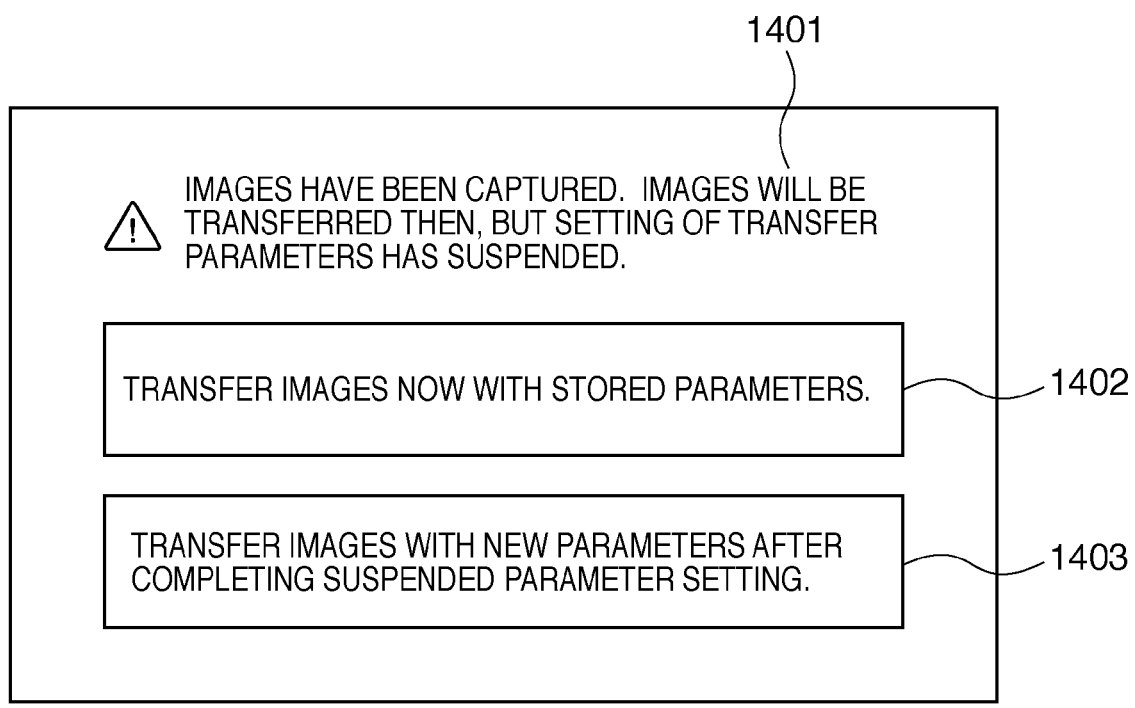
FIG. 14 is a view showing an example of a window displayed on the digital camera.

FIG. 14 shows an example of the first selection window. In the first selection window, a message 1401 represents that image sensing processing serving as interruption processing is complete, and that setting of transfer parameters associated with subsequent transfer processing is not complete. The system controller 50 displays icons 1402 and 1403 in the first selection window. The icon 1403 is used to instruct the system controller 50 to perform transfer processing with newly set transfer parameters upon completion of the suspended setting processing. The icon 1402 is used to instruct the system controller 50 to perform transfer processing with transfer parameters stored in the nonvolatile memory 56.

It should be noted that, instead of a display representing that setting processing has suspended, the notifying unit 54 may also notify the user by sound that setting processing has suspended.

In response to the display of the first selection window, the input unit 75 accepts a selection instruction to select whether to resume the transfer parameter setting processing. This selection instruction corresponds to an instruction to select the icon 1402 or 1403. The system controller 50 determines, from the selection instruction, whether to resume the transfer parameter setting processing. If the system controller 50 determines to resume the transfer parameter setting processing, that is, the user has selected the icon 1403 (YES in step S712), it advances the process to step S713. If the system controller 50 determines not to resume the transfer parameter setting processing, that is, the user has selected the icon 1402 (NO in step S712), it advances the process to step S714.

A case where the system controller 50 determines in step S712 to resume the transfer parameter setting processing (YES in step S712) will be explained. In this case, the system controller 50 performs processing of resuming the transfer parameter setting processing from a state upon suspension.

The system controller 50 sets OFF the setting suspended flag (step S713).

The system controller 50 displays a menu and the like upon suspension on the notifying unit 54 based on the suspension information stored in the memory 52 (step S715).

The system controller 50 resumes the transfer parameter setting processing from a suspended menu item, and sets new transfer parameters based on a user operation or the like (step S716). At this time, the system controller 50 executes processes which have not been done before suspension out of processes in steps S605 to S609. The burden of setting processing on the user can be reduced by resuming the setting processing based on information stored upon suspension.

If the system controller 50 determines that all steps of the transfer parameter setting processing has ended (YES in step S717), it advances the process to step S718. If the system controller 50 determines that any steps of the transfer parameter setting processing has not yet ended (NO in step S717), it repeats the process (step S716).

If the system controller 50 determines that there is an image to be transferred (YES in step S718), it transfers the image with transfer parameters newly set in step S716 (step S719). If the system controller 50 determines that there is no image to be transferred (NO in step S718), it ends the process.

Upon completion of the transfer processing in step S719, the system controller 50 determines whether the setting suspended flag is ON (step S720). If the process reaches this step via step S713, the setting suspended flag is OFF. Hence (NO in step S720), the system controller 50 ends the process.

The case where the system controller 50 determines in step S712 to resume the transfer parameter setting processing has been explained. Next, a case where the system controller 50 determines in step S712 not to resume the transfer parameter setting processing (NO in step S712) will be explained. In this case, the system controller 50 performs transfer processing with transfer parameters which have already been set. More specifically, the system controller 50 reads out transfer parameters stored in the nonvolatile memory 56 (step S714), and executes the same transfer processing as steps S313 to S315 (step S719).

After executing the transfer processing, the system controller 50 determines whether the setting suspended flag is ON (step S720). If the process reaches this step via step S714, the setting suspended flag is ON (see step S709).

If the system controller 50 determines that the setting suspended flag is ON (YES in step S720), it displays the second selection window on the notifying unit 54. The second selection window prompts the user to select whether to continuously set transfer parameters (step S721). FIG. 15 shows an example of the second selection window. In the second selection window, a message 1501 represents that transfer processing is completed, and that whether to resume the setting processing need to be instructed. The system controller 50 displays icons 1502 and 1503 in the second selection window. The icon 1502 is used to instruct the system controller 50 to resume the setting processing. The icon 1503 is used to instruct the system controller 50 not to resume the setting processing.

The input unit 75 accepts, via the display of the second selection window, a selection instruction whether to resume setting of transfer parameters. The system controller 50 determines, from the selection instruction, whether to resume the setting processing. If the system controller 50 determines to resume the transfer parameter setting processing (YES in step S722), it advances the process to step S713 (D). If the system controller 50 determines not to resume the setting processing (NO in step S722), it ends the process.

As described above, when interruption processing occurs during transfer parameter setting processing, the digital camera according to the embodiment executes image sensing processing first. Thus, the user does not miss a photo opportunity.

Before transfer processing performed after image sensing processing, the digital camera according to the embodiment allows the user to select whether to resume transfer parameter setting processing. Hence, even if interruption processing occurs, transfer processing can be done upon completion of setting new transfer parameters.

When transfer parameter setting processing does not become resumed, the digital camera according to the embodiment performs transfer processing using transfer parameters stored in the nonvolatile memory 56. For example, when the user wants to transfer an image quickly, transfer processing can be done without waiting for the completion of suspended setting processing.

The digital camera according to the embodiment prompts the user to select whether to perform transfer processing after newly setting transfer parameters or perform transfer processing using stored transfer parameters. This implements flexible setting processing suited to the user situation.

The case where shooting processing including transfer processing is done during transfer parameter setting processing has been described.

Next, setting processing for setting parameters (to be referred to as encryption parameters hereinafter) associated with encryption processing will be described.

Figure 8:
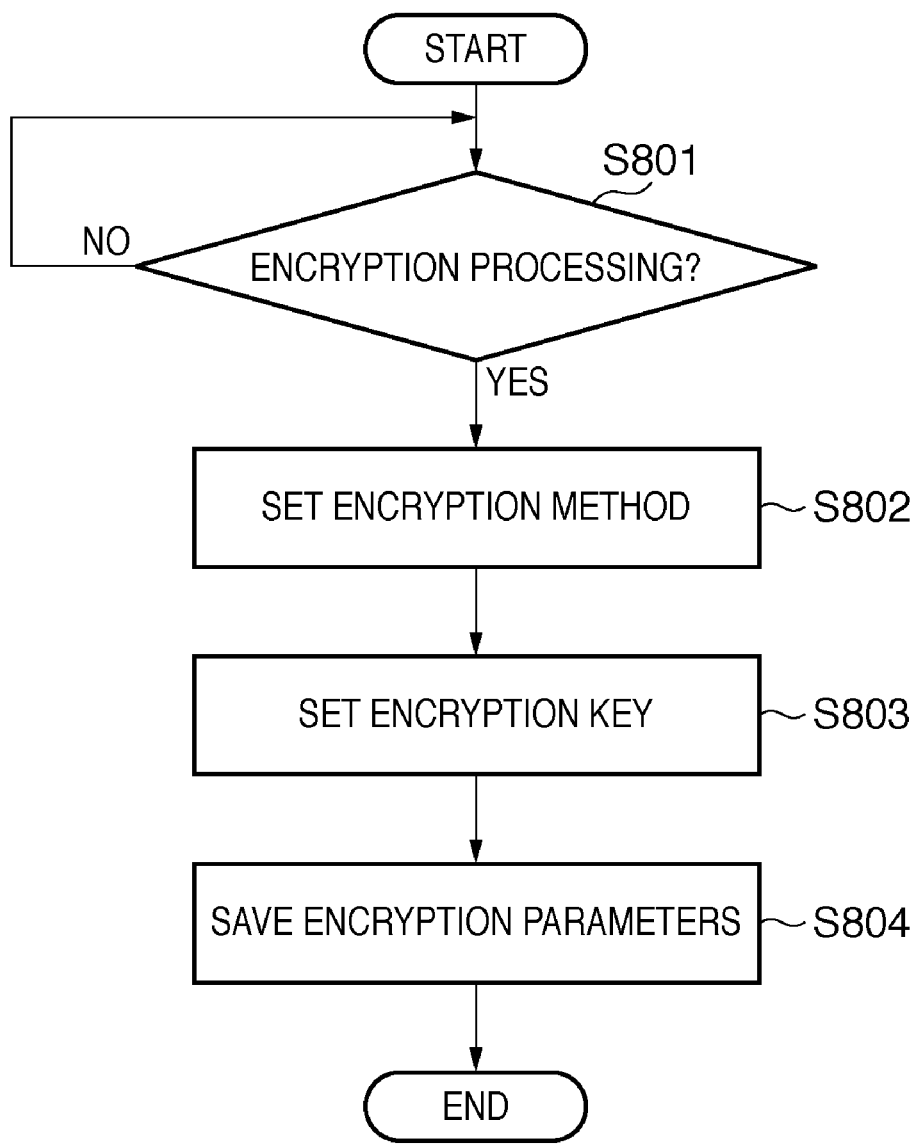
FIG. 8 is a flowchart showing the sequence of processing when interruption processing does not occur during setting processing for setting encryption parameters.

A case where interruption processing does not occur during setting processing will be explained. FIG. 8 is a flowchart showing the sequence of processing when interruption processing does not occur during encryption parameter setting processing.

The operation unit 70 accepts a display instruction from the user to display a setup menu for setting parameters, and supplies the instruction to the system controller 50. In response to the display instruction, the system controller 50 displays the setup menu on the notifying unit 54. Then, this sequence starts. The system controller 50 receives an item selection instruction from the selection dial 302 to select a setting item, and receives a finalization instruction from the set button 300 to finalize a selected item. The system controller 50 waits until it receives an instruction to select setting of encryption parameters as a setting item. If not receiving this instruction (NO in step S801), the system controller 50 repeats the process (step S801). When receiving this instruction (YES in step S801), the system controller 50 advances the process to step S802 (step S801).

The system controller 50 starts encryption parameter setting processing. As the first step of the setting processing, the system controller 50 sets an encryption method as one encryption parameter. More specifically, the system controller 50 receives an instruction from the input unit 75 to display an encryption parameter setup window. The system controller 50 displays the encryption parameter setup window on the notifying unit 54 in accordance with the instruction. The input unit 75 accepts, via the encryption parameter setup window displayed on the notifying unit 54, an instruction to select an encryption method. There are various encryption methods such as DES, triple DES, and AES. The system controller 50 receives an instruction from the input unit 75 to select an encryption method, and temporarily stores the selected encryption method information in the memory 52 (step S802).

The system controller 50 sets an encryption key as one encryption parameter. The input unit 75 accepts, via the encryption processing setup window displayed on the notifying unit 54, an instruction to designate an encryption key. The system controller 50 receives the instruction from the input unit 75 to designate an encryption key, and temporarily stores the designated encryption key information in the memory 52 (step S803).

The system controller 50 reads out the encryption parameters temporarily stored in steps S802 and S803 from the memory 52, and stores them in the nonvolatile memory 56 (step S804). Then, the sequence ends.

This processing is encryption parameter setting processing when interruption processing does not occur.

Figure 9A:
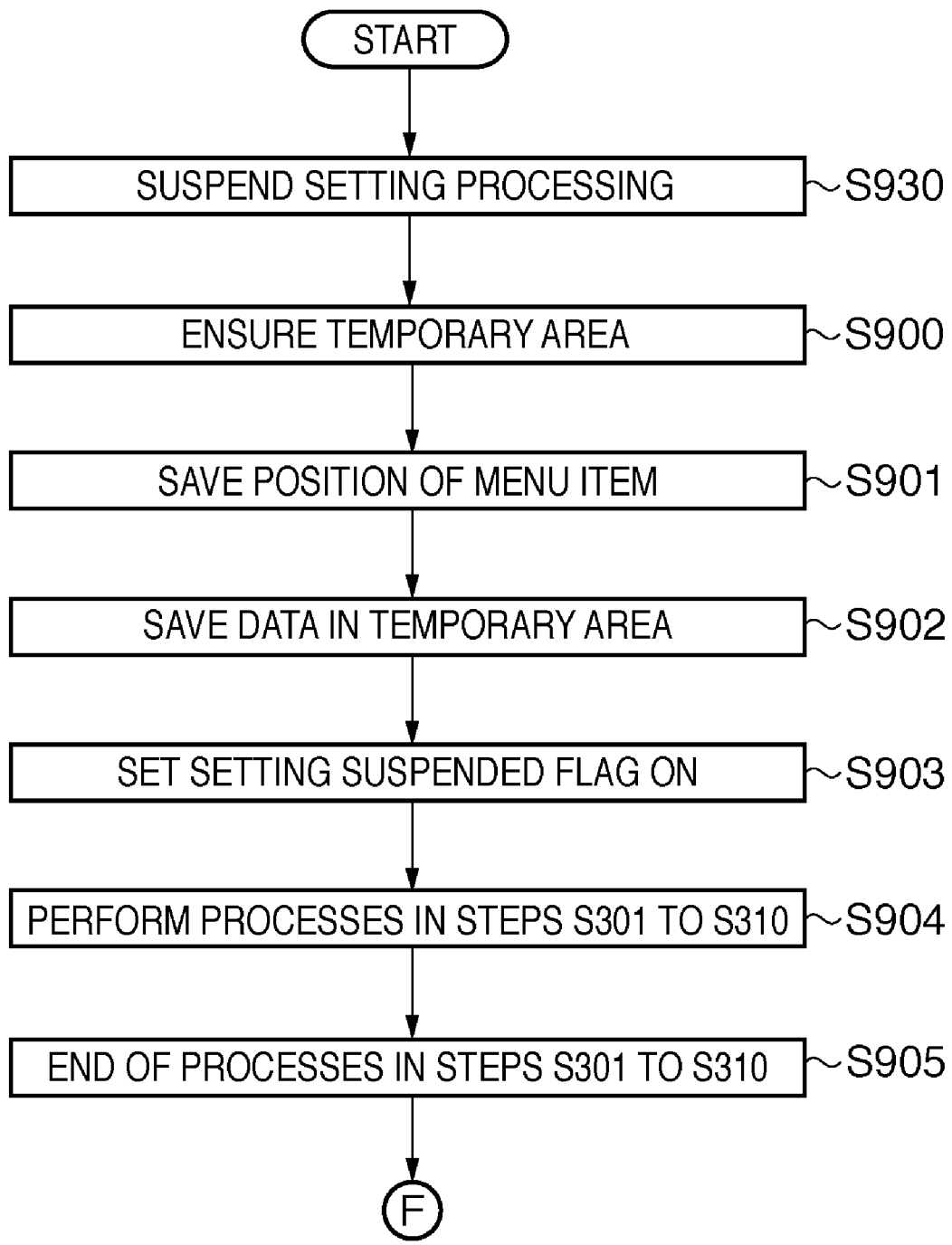
FIGS. 9A and 9B are flowcharts showing the sequence of processing when shooting processing occurs as interruption processing during setting processing for setting encryption parameters.
Figure 9B:
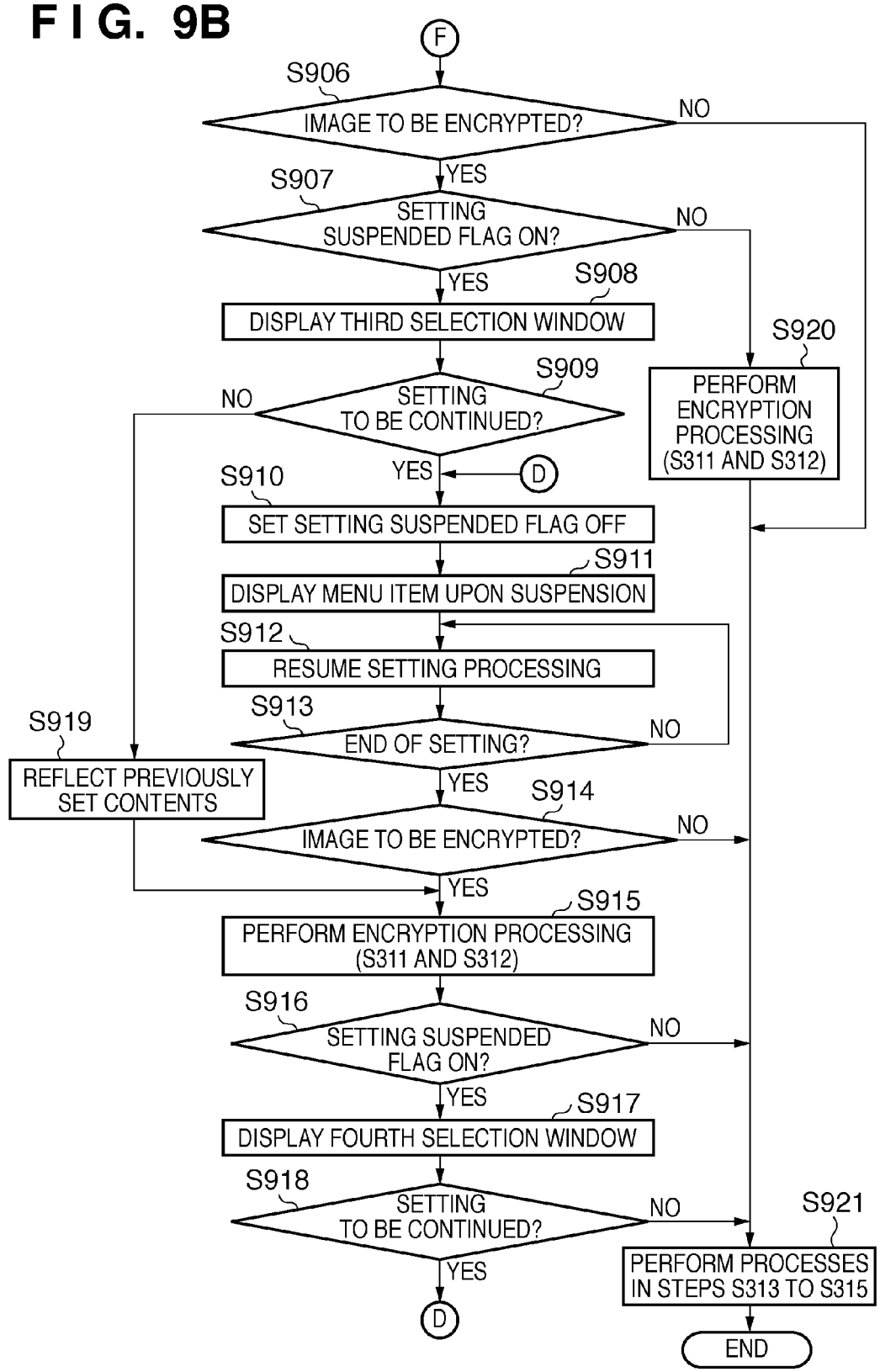

A case where shooting processing, which is a kind of interruption processing, occurs during setting of encryption parameters will be explained. FIGS. 9A and 9B are flowcharts showing the sequence of processing executed by the digital camera 100 during setting of encryption parameters.

This sequence starts when the system controller 50 detects that the user has pressed the shutter button 61 during setting of encryption parameters, for example, during processes in steps S802 and S803. When the system controller 50 detects that the user has pressed the shutter button 61, it suspends the encryption parameter setting processing (step S930). As described with reference to FIG. 5, the digital camera 100 according to the embodiment can perform encryption processing subsequently to image sensing processing. The encryption processing uses encryption parameters.

The system controller 50 ensures a temporary space in the memory 52 to store a parameter, setting of which is not complete (step S900).

The system controller 50 saves, as suspension information in the memory 52, information for identifying a parameter, setting of which is not complete, for example, information representing the progress of setting processing and the cursor position on the window upon suspension (step S901).

The system controller 50 saves, in the temporary area of the memory 52 that has been ensured in step S900, the encryption parameter value which has already been input when the setting processing suspends (step S902). The encryption parameter saved in this step is, for example, an encryption key. The encryption key may be a long character string. Thus, if only part of the encryption key is input, the input part is saved.

The system controller 50 sets ON a suspend flag representing that the processing has suspended during setting of encryption parameters (step S903).

It should be noted that the system controller 50 may also automatically save data in the temporary area in each setting step.

The system controller 50 performs image sensing processing and image processing. More specifically, the system controller 50 performs processes in steps S301 to S310 of FIG. 5 (step S904).

In response to the end of the processes in steps S301 to S310, the system controller 50 advances the process to step S906 (step S905) (F).

Figure 16:
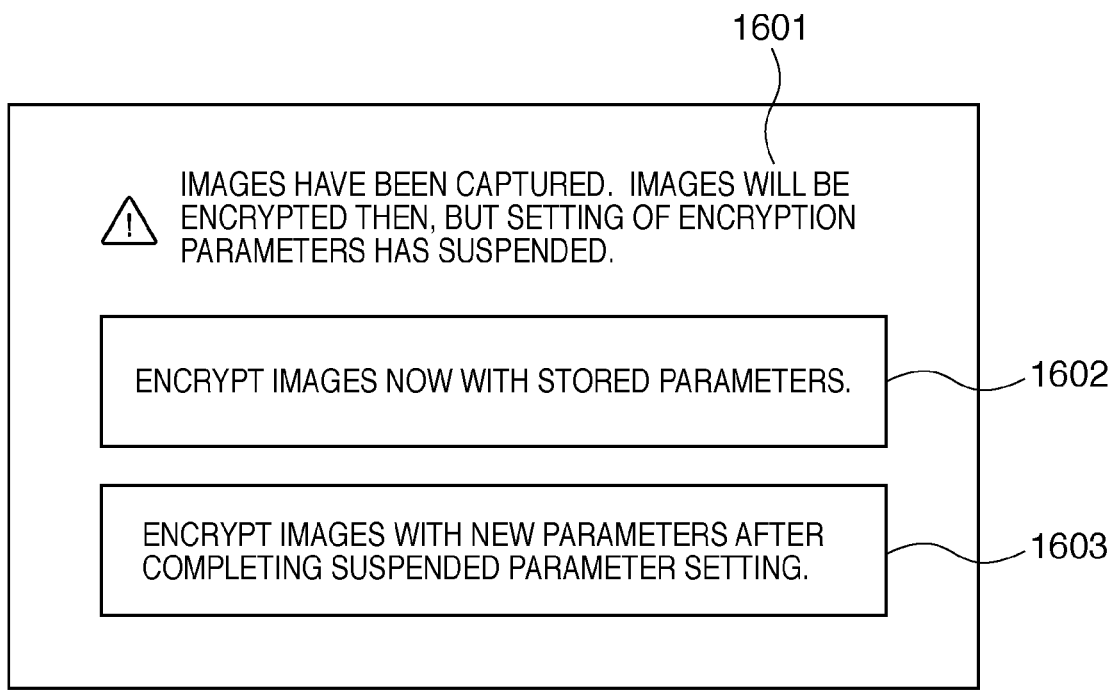
FIG. 16 is a view showing an example of a window displayed on the digital camera.

The system controller 50 determines whether to encrypt a sensed image. For example, the system controller 50 determines whether it has received an encryption instruction based on a user operation after image sensing, or whether it is set in advance to encrypt an image after shooting. If the system controller 50 determines not to encrypt an image (NO in step S906), it advances the process to step S921. If the system controller 50 determines to encrypt an image (YES in step S906), it determines, by referring to the setting suspended flag, whether the encryption parameter setting processing has suspended (step S907). If the system controller 50 determines that encryption parameter setting processing has not suspended (NO in step S907), it performs encryption processing for image data in accordance with encryption parameters currently stored in the nonvolatile memory 56 (step S920). If the system controller 50 determines that the encryption parameter setting processing has suspended (YES in step S907), it displays the third selection window on the notifying unit 54 (step S908). FIG. 16 shows an example of the third selection window. In the third selection window, a message 1601 represents that image sensing processing serving as interruption processing is complete, and that setting of encryption parameters associated with subsequent encryption processing is not complete. The system controller 50 displays icons 1602 and 1603 in the third selection window. The icon 1603 is used to instruct the system controller 50 to perform encryption processing with newly set encryption parameters upon completion of suspended setting processing. The icon 1602 is used to instruct the system controller 50 to perform encryption processing with encryption parameters stored in the nonvolatile memory 56.

It should be noted that instead of a display representing that setting processing has suspended, the notifying unit 54 may also notify the user by sound that setting processing has suspended.

In response to the display of the third selection window, the input unit 75 accepts a selection instruction to select whether to resume the setting processing. This selection instruction corresponds to an instruction to select the icon 1602 or 1603. The system controller 50 determines, from the selection instruction, whether to resume the encryption parameter setting processing. If the system controller 50 determines to resume setting of encryption parameters, that is, the user has selected the icon 1603 (YES in step S909), it advances the process to step S910. If the system controller 50 determines not to resume the setting, that is, the user has selected the icon 1602 (NO in step S909), it advances the process to step S919.

A case where the system controller 50 determines in step S909 to resume the encryption parameter setting processing (YES in step S909) will be explained. In this case, the system controller 50 performs processing of resuming the encryption parameter setting processing from a state upon suspension.

The system controller 50 sets OFF the setting suspended flag (step S910).

The system controller 50 displays a menu and the like upon suspension on the notifying unit 54 based on the suspension information stored in the memory 52 (step S911).

The system controller 50 resumes the encryption parameter setting processing from a suspended menu item, and sets new encryption parameters based on a user operation or the like (step S912). At this time, the system controller 50 executes processes which have not been done before suspension out of processes in steps S802 to S804. The burden of setting processing on the user can be reduced by resuming the setting processing based on information stored upon suspension.

If the system controller 50 determines that all steps of the encryption parameter setting processing has ended (YES in step S913), it advances the process to step S914. If the system controller 50 determines that any steps of the encryption parameter setting processing has not yet ended (NO in step S913), it repeats the process (step S912).

If the system controller 50 determines that there is an image to be encrypted (YES in step S914), it encrypts the image with encryption parameters newly set in step S912 (step S915). If the system controller 50 determines that there is no image to be encrypted (NO in step S914), it advances the process to step S921.

Upon completion of the encryption processing in step S915, the system controller 50 determines whether the setting suspended flag is ON (step S916). If the process reaches this step via step S910, the setting suspended flag is OFF. Hence (NO in step S916), the system controller 50 advances the process to step S921.

In step S921, the system controller 50 executes processes in steps S313 to S315 in accordance with settings.

The case where the system controller 50 determines in step S909 to resume the encryption parameter setting processing has been explained.

Next, a case where the system controller 50 determines in step S909 not to resume the encryption parameter setting processing (NO in step S909) will be explained.

In this case, the system controller 50 performs encryption processing with encryption parameters which have already been set. More specifically, the system controller 50 reads out encryption parameters stored in the nonvolatile memory 56 (step S919), and executes the same encryption processing as steps S311 and S312 (step S915).

Upon completion of the encryption processing, the system controller 50 determines whether the setting suspended flag is ON (step S916). If the process reaches this step via step S919, the setting suspended flag is ON (see step S907).

If the system controller 50 determines that the setting suspended flag is ON (YES in step S916), it displays the fourth selection window on the notifying unit 54 (step S917). The fourth selection window prompts the user to select whether to continuously set encryption parameters. The fourth selection window also displays a message that the encryption parameter setting processing has suspended.

The input unit 75 accepts, via the display of the fourth selection window, an instruction whether to resume setting of encryption parameters. The system controller 50 determines, from the selection instruction, whether to resume the encryption parameter setting processing. If the system controller 50 determines to resume the setting processing (YES in step S918), it advances the process to step S910 (D). If the system controller 50 determines not to resume the setting processing (NO in step S918), it advances the process to step S921.

As described above, when interruption processing occurs during encryption parameter setting processing, the digital camera according to the embodiment executes image sensing processing first. Thus, the user does not miss a photo opportunity.

Before encryption processing performed after image sensing processing, the digital camera according to the embodiment allows the user to select whether to resume encryption parameter setting processing. Even if interruption processing occurs, encryption processing can be done upon completion of setting new encryption parameters.

When encryption parameter setting processing does not become resumed, the digital camera according to the embodiment performs encryption processing using encryption parameters stored in the nonvolatile memory 56. For example, when the user wants to store an image quickly, encryption processing can be done without waiting for the completion of suspended setting processing. This can shorten the time until an image is stored.

The digital camera according to the embodiment prompts the user to select whether to perform encryption processing after newly setting encryption parameters or perform encryption processing using stored encryption parameters. This implements flexible setting processing proper for the user situation.

The case where shooting processing including encryption processing is done during encryption parameter setting processing has been described.

Next, setting processing for setting parameters (to be referred to as image processing parameters hereinafter) associated with image processing such as compression processing or developing processing will be described.

A case where interruption processing does not occur during image processing parameter setting processing will be explained. FIG. 10 is a flowchart showing the sequence of processing when interruption processing does not occur during image processing parameter setting processing.

The operation unit 70 accepts a display instruction from the user to display a setup menu for setting parameters, and supplies the instruction to the system controller 50. In response to the display instruction, the system controller 50 displays the setup menu of the digital camera 100 on the notifying unit 54. Then, this sequence starts. The system controller 50 receives an item selection instruction from the selection dial 302 to select a setting item, and receives a finalization instruction from the set button 300 to finalize a selected item. The system controller 50 waits until it receives an instruction to select setting of image processing parameters as a setting item. If not receiving this instruction (NO in step S1001), the system controller 50 repeats the process. When receiving this instruction (YES in step S1001), the system controller 50 advances the process to step S1002.

In step S1002, the system controller 50 starts image processing parameter setting processing. The system controller 50 sets an image compression format as one image processing parameter. More specifically, the system controller 50 receives instructions from the operation unit 70, set button 300, and selection dial 302 to display an image processing parameter input window. The system controller 50 displays the image processing parameter setup window on the notifying unit 54 in accordance with the instruction. The input unit 75 accepts, via the image processing parameter setup window displayed on the notifying unit 54, an instruction to select an image compression format. The image compression format includes JPEG and RAW. The system controller 50 receives an instruction from the input unit 75 to select an image type, and temporarily stores the selected image type information in the memory 52 (step S1002).

The system controller 50 sets a compression ratio as one image processing parameter. The input unit 75 accepts, via the image processing setup window displayed on the notifying unit 54, an instruction to designate a compression ratio. The system controller 50 receives the instruction from the input unit 75 to designate a compression ratio, and temporarily stores the designated compression ratio information in the memory 52 (step S1003).

The system controller 50 sets a developing style as one image processing parameter. The input unit 75 accepts, via the image processing setup window displayed on the notifying unit 54, an instruction to designate a developing style. The developing style includes a style for developing an image in monochrome, a style for developing an image while making the skin color clear, and a style for developing an image while making yellow clear. The system controller 50 receives the instruction from the input unit 75 to designate a developing style, and temporarily stores the designated developing style information in the memory 52 (step S1004).

Although not shown, when there are other image processing parameters to be set, they are sequentially set similarly to steps S1002 to S1004.

The system controller 50 reads out the image processing parameters temporarily stored in steps S1002 to S1004 from the memory 52, and stores them in the nonvolatile memory 56 (step S1005). Then, the system controller 50 ends the sequence.

This processing is image processing parameter setting processing when interruption processing does not occur.

Figure 11A:
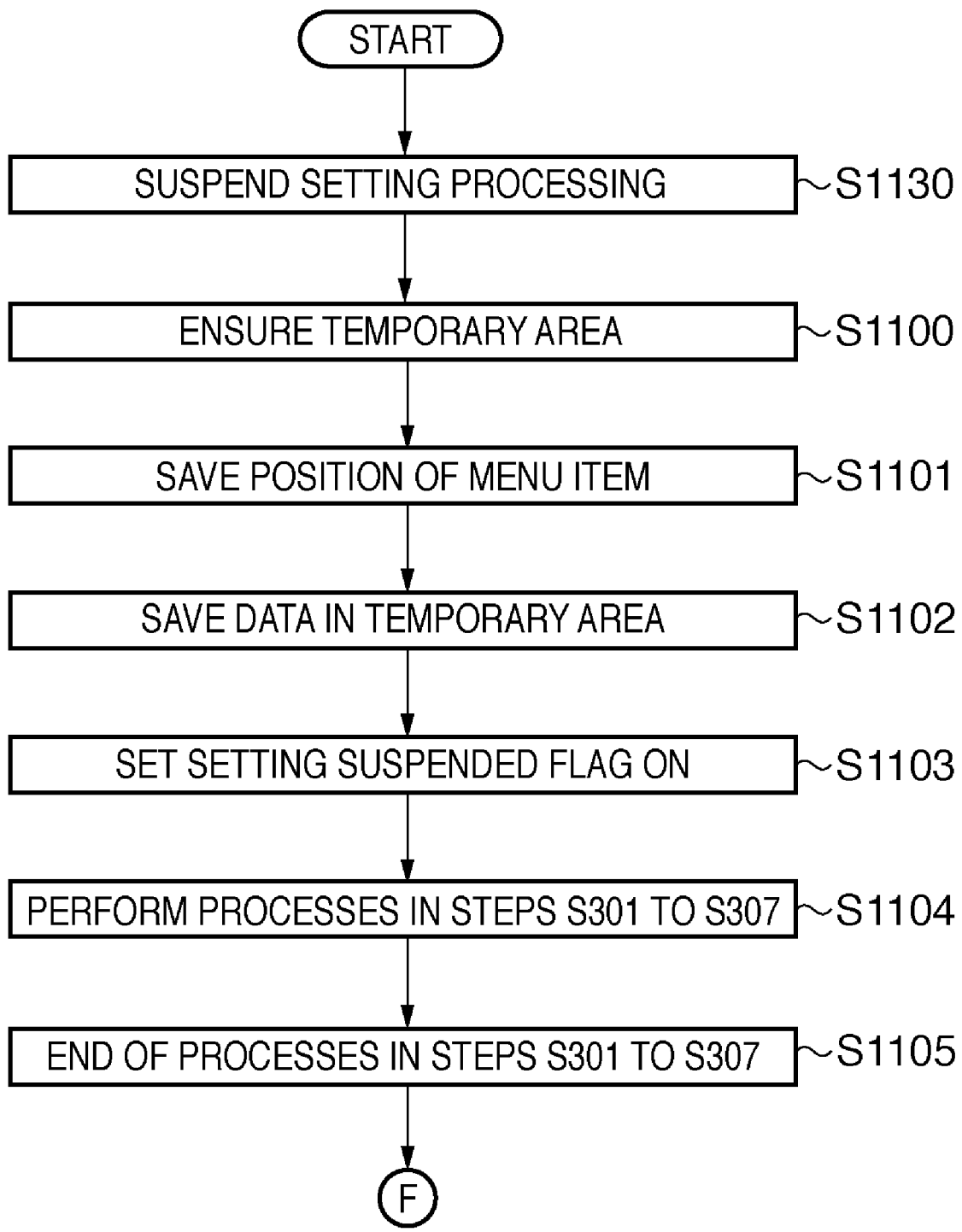
FIGS. 11A and 11B are flowcharts showing the sequence of processing when shooting processing occurs as interruption processing during setting processing for setting image processing parameters.
Figure 11B:
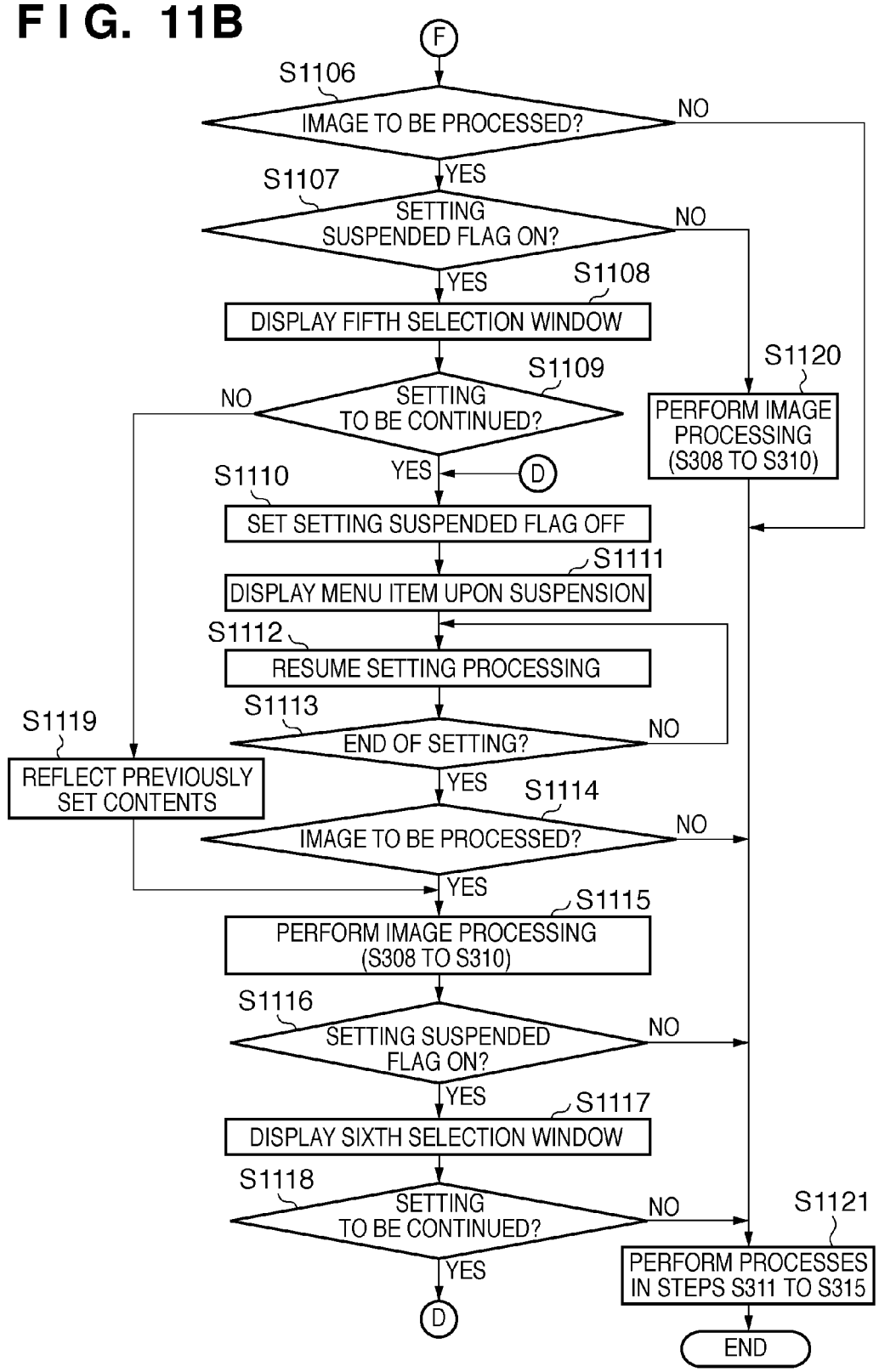

A case where shooting processing, which is a kind of interruption processing, occurs during setting of image processing parameters will be explained. FIGS. 11A and 11B are flowcharts showing the sequence of processing executed by the digital camera 100 when shooting processing occurs during setting of image processing parameters.

This sequence starts when the system controller 50 detects that the user has pressed the shutter button 61 during setting of image processing parameters, for example, during processes in steps S1002 to S1004. When the system controller 50 detects that the user has pressed the shutter button 61, it suspends the image processing parameter setting processing (step S1130).

The system controller 50 ensures a temporary space in the memory 52 to store a parameter, setting of which is not complete (step S1100).

The system controller 50 saves, as suspension information in the memory 52, information for identifying a parameter, setting of which is not complete, for example, information representing the progress of setting processing and the cursor position on the window upon suspension (step S1101).

The system controller 50 saves, in the temporary area of the memory 52 that has been ensured in step S1100, the image processing parameter value which has already been input when the setting processing suspends (step S1102).

The system controller 50 sets ON a suspend flag representing that the processing has suspended during setting of image processing parameters (step S1103).

It should be noted that the system controller 50 may also automatically save data in the temporary area in each setting step.

The system controller 50 performs image sensing processing. More specifically, the system controller 50 performs processes in steps S301 to S307 of FIG. 5 (step S1104).

In response to the end of the processes in steps S301 to S307, the system controller 50 advances the process to step S1106 (step S1105) (F).

The system controller 50 determines whether to process a sensed image. For example, the system controller 50 determines whether it has received an image processing instruction based on a user operation after image sensing, or whether it is set in advance to execute image processing after image sensing. If the system controller 50 determines not to perform image processing (NO in step S1106), it advances the process to step S1120. If the system controller 50 determines to perform image processing (YES in step S1106), it determines, by referring to the setting suspended flag, whether the image processing parameter setting processing has suspended. If the system controller 50 determines that image processing parameter setting processing has not suspended (NO in step S1107), it performs image processing in accordance with image processing parameters stored in the nonvolatile memory 56 (step S1120). If the system controller 50 determines that the image processing parameter setting processing has suspended (YES in step S1107), it displays the fifth selection window on the notifying unit 54 (step S1108). The system controller 50 displays in the fifth selection window a message that image sensing for data serving as interruption processing is complete, and that setting of image processing parameters associated with subsequent image processing is not complete. The system controller 50 displays icons for prompting the user to select whether to perform image processing with new image processing parameters upon completion of suspended setting of image processing parameters, or whether to perform image processing with image processing parameters stored in the nonvolatile memory 56.

It should be noted that, instead of a display representing that setting processing has suspended, the notifying unit 54 may also notify the user by sound that setting processing has suspended.

In response to the display of the fifth selection window, the input unit 75 accepts a selection instruction to select whether to resume the setting processing. This selection instruction corresponds to an instruction to select the icon displayed in the fifth selection window. The system controller 50 determines, from the selection instruction, whether to resume the image processing parameter setting processing. If the system controller 50 determines to resume the setting processing (YES in step S1109), it advances the process to step S1110. If the system controller 50 determines not to resume the setting processing (NO in step S1109), it advances the process to step S1119.

A case where the system controller 50 determines to resume the image processing parameter setting processing (YES in step S1109) will be explained. In this case, the system controller 50 performs processing of resuming the image processing parameter setting processing from a state upon suspension.

The system controller 50 sets OFF the setting suspended flag (step S1110).

The system controller 50 displays a menu and the like upon suspension on the notifying unit 54 based on the suspension information stored in the memory 52 (step S1111).

The system controller 50 resumes the image processing parameter setting processing from a suspended menu item, and sets new image processing parameters based on a user operation or the like (step S1112). At this time, the system controller 50 executes processes which have not been done before suspension out of processes in steps S1002 to S1005. The burden of setting processing on the user can be reduced by resuming the setting processing based on information stored upon suspension.

If the system controller 50 determines that all steps of the image processing parameter setting processing has ended (YES in step S1113), it advances the process to step S1114. If the system controller 50 determines that any steps of the image processing parameter setting processing has not yet ended (NO in step S1113), it repeats the process (step S1112).

If the system controller 50 determines in step S1114 that there is an image to be processed (YES in step S1114), it performs image processing with image processing parameters newly set in step S1112 (step S1115).

If the system controller 50 determines that there is no image to be processed (NO in step S1114), it advances the process to step S1121 to execute processes in steps S311 to S315 in accordance with settings.

Upon completion of the image processing in step S1115, the system controller 50 determines whether the setting suspended flag is ON (step S1116). If the process reaches this step via step S1110, the setting suspended flag is OFF. Hence (NO in step S1116), the system controller 50 advances the process to step S1121, and executes processes in steps S311 to S315 in accordance with settings.

The case where the system controller 50 determines in step S1109 to resume the image processing parameter setting processing has been explained.

Next, a case where the system controller 50 determines not to resume the image processing parameter setting processing (NO in step S1109) will be explained.

In this case, the system controller 50 performs image processing with image processing parameters which have already been set. More specifically, the system controller 50 reads out image processing parameters stored in the nonvolatile memory 56 (step S1119), and executes the same processing as steps S308 to S310 (step S1115).

Upon completion of the image processing, the system controller 50 determines whether the setting suspended flag is ON. If the process reaches this step via step S1119, the setting suspended flag is ON (see step S1107).

If the system controller 50 determines that the setting suspended flag is ON (YES in step S1116), it displays the sixth selection window on the notifying unit 54 (step S1117). The sixth selection window prompts the user to select whether to continuously set image processing parameters. The sixth selection window also displays a message that the image processing parameter setting processing has suspended.

The input unit 75 accepts, via the display of the sixth selection window, an instruction whether to resume setting of image processing parameters. The system controller 50 determines, from the selection instruction, whether to resume setting of image processing parameters. If the system controller 50 determines to resume the setting processing (YES in step S1118), it advances the process to step S1110 (D). If the system controller 50 determines not to resume the setting processing (NO in step S1118), it advances the process to step S1121.

As described above, when interruption processing occurs during image processing parameter setting processing, the digital camera according to the embodiment executes image sensing processing first. Hence, the user does not miss a photo opportunity.

Before image processing performed after image sensing processing, the digital camera according to the embodiment allows the user to select whether to resume image processing parameter setting processing. Even if interruption processing occurs, image processing can be done upon completion of setting new image processing parameters.

When image processing parameter setting processing does not become resumed, the digital camera according to the embodiment performs image processing using image processing parameters stored in the nonvolatile memory 56. For example, when the user wants to store an image quickly, image processing can be done without waiting for the completion of suspended setting processing. This can shorten the time until an image is stored.

The digital camera according to the embodiment prompts the user to select whether to perform image processing after newly setting image processing parameters or perform image processing using stored image processing parameters. This implements flexible setting processing suitable for the user situation.

The case where an instruction for shooting processing serving as interruption processing is issued has been described. A case where an instruction for requested image transfer processing serving as interruption processing is issued will be described. The digital camera 100 according to the embodiment can transfer an image to an external apparatus successively to shooting processing. In addition, the digital camera 100 can also transfer images stored in the recording media 200 and 210 in response to a data request from an external apparatus. In the embodiment, transfer processing executed in response to a data request from an external apparatus will be called requested image transfer processing. In the requested image transfer processing, an image is transferred to an external apparatus after performing security processing on the basis of parameters (to be referred to as security parameters hereinafter) associated with security such as the cipher system. That is, the requested image transfer processing includes processing of receiving and storing a data request from an external apparatus, security processing, and transfer processing.

Processing when requested image transfer processing serving as interruption processing occurs during security parameter setting processing will be described.

A case where interruption processing does not occur during security parameter setting processing will be explained. FIG. 12 shows the operation of the digital camera 100 in security parameter setting processing.

The operation unit 70 accepts a display instruction from the user to display a setup menu for setting parameters, and supplies the instruction to the system controller 50. In response to the display instruction, the system controller 50 displays the setup menu on the notifying unit 54. Then, this sequence starts. The system controller 50 receives an item selection instruction from the selection dial 302 to select a setting item. The system controller 50 waits until it receives an instruction to select setting of security parameters as a setting item. If not receiving this instruction (NO in step S1201), the system controller 50 repeats the process. When receiving this instruction (YES in step S1201), the system controller 50 advances the process to step S1202.

In step S1202, the system controller 50 starts security parameter setting processing. Setting of the encryption type will be described as an example of the security parameters. The system controller 50 receives instructions from the operation unit 70, set button 300, and selection dial 302 to display a security parameter setting window. The system controller 50 displays the security parameter setup window on the notifying unit 54 in accordance with the instruction. The input unit 75 accepts, via the security parameter setup window displayed on the notifying unit 54, an instruction to select an encryption type. There are various encryption types such as DES, triple DES, and AES. The system controller 50 receives an instruction from the input unit 75 to select an encryption type, and temporarily stores the selected encryption type information in the memory 52 (step S1202). If other security parameters need to be set, they are sequentially set and stored in the memory 52.

The system controller 50 reads out the security parameters stored in the memory 52, and stores them in the nonvolatile memory 56 (step S1203).

Figure 13A:
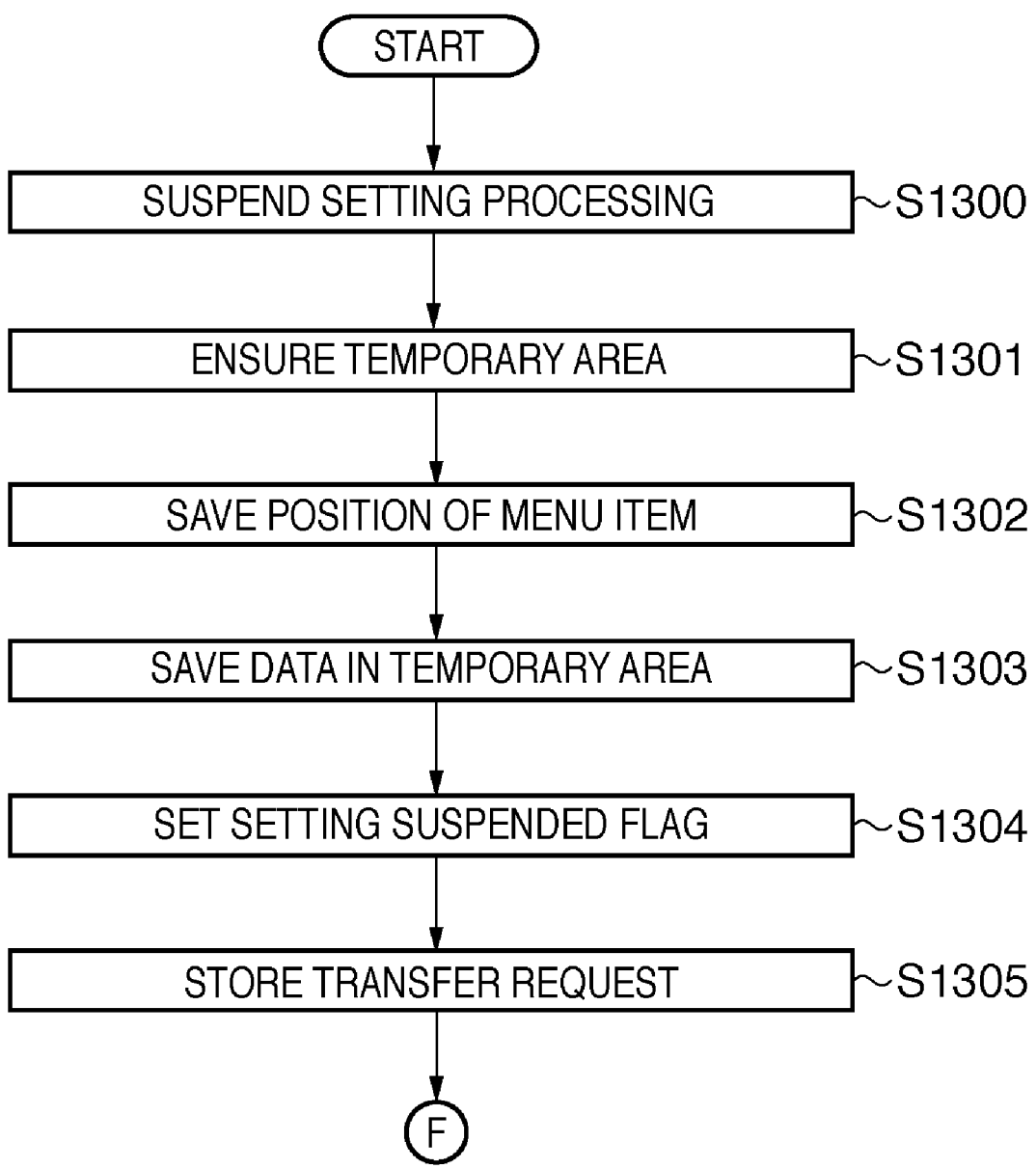
FIGS. 13A and 13B are flowcharts showing the sequence of processing when requested image transfer processing occurs as interruption processing during setting processing for setting image processing parameters.
Figure 13B:
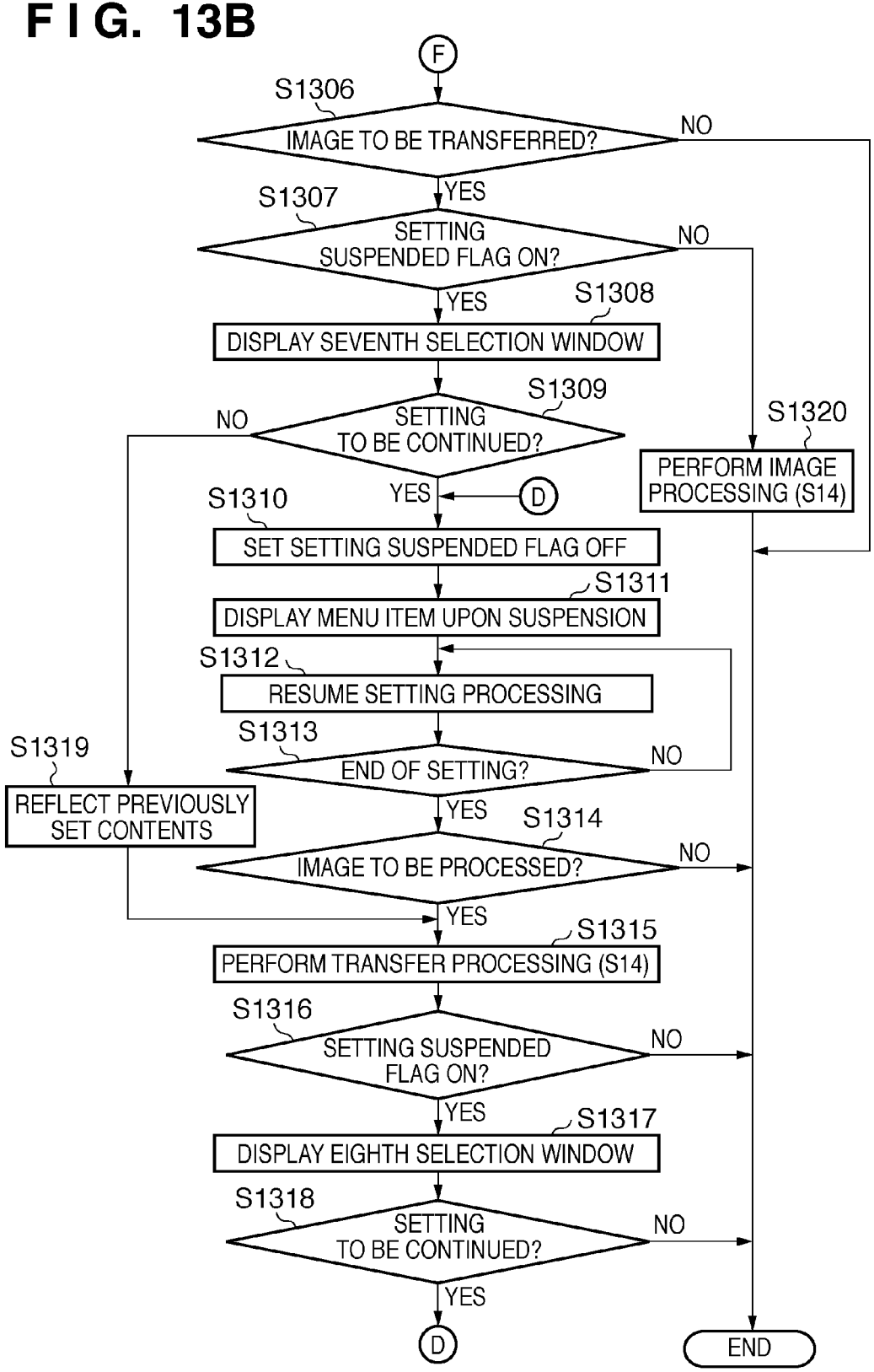

A case where an instruction for requested image transfer processing serving as interruption processing is issued will be described. FIGS. 13A and 13B are flowcharts showing the sequence of processing when an instruction for requested image transfer processing serving as a kind of interruption processing is received during security parameter setting processing.

This sequence starts when the system controller 50 detects that it has received an image transfer request from an external apparatus during security parameter setting processing, for example, in step S1202. The transfer request is received via the connector (antenna) 112.

When the system controller 50 detects that it has received the transfer request, it suspends the security parameter setting processing (step S1300).

The system controller 50 ensures a temporary space in the memory 52 to store a parameter, setting of which is not complete (step S1301).

The system controller 50 saves, as suspension information in the memory 52, information for identifying a parameter, setting of which is not complete, for example, information representing the progress of setting processing and the cursor position on the window upon suspension (step S1302).

The system controller 50 saves, in the temporary area of the memory 52 that has been ensured in step S1301, the parameter value which has already been input when the setting processing suspends (step S1303). The system controller 50 sets ON a suspend flag representing that the processing has suspended during setting of security parameters (step S1304).

It should be noted that the system controller 50 may also automatically save data in the temporary area in each setting step.

The system controller 50 stores the received transfer request in the nonvolatile memory 56 (step S1305).

Upon completion of storing security parameters in the temporary area, the system controller 50 determines whether to transfer an image. If the system controller 50 determines not to transfer an image (NO in step S1306), it ends the process. If the system controller 50 determines to transfer an image (YES in step S1306), it determines, by referring to the setting suspended flag, whether the security parameter setting processing has suspended. If the system controller 50 determines that security parameter setting processing has not suspended (NO in step S1307), it performs transfer processing based on security parameters currently stored in the nonvolatile memory 56 (step S1320). If the system controller 50 determines that the security parameter setting processing has suspended (YES in step S1307), it displays the seventh selection window on the notifying unit 54 (step S1308). FIG. 17 shows the seventh selection window. In the seventh selection window, a message 1701 represents that a transfer request has been received and storage processing is complete, and that setting of security parameters associated with subsequent requested image transfer processing is not complete. The system controller 50 displays icons 1702 and 1703 in the seventh selection window. The icon 1703 is used to instruct the system controller 50 to perform security processing with new security parameters upon completion of the suspended security parameter setting processing. The icon 1702 is used to instruct the system controller 50 to perform security processing with security parameters stored in the nonvolatile memory 56 (step S1308).

In response to the display of the seventh selection window, the input unit 75 accepts a selection instruction to select whether to resume the security parameter setting processing. This selection instruction corresponds to an instruction to select the icon 1702 or 1703. The system controller 50 determines, from the selection instruction, whether to resume the security parameter setting processing. If the system controller 50 determines to resume the setting processing, that is, the user has selected the icon 1703 (YES in step S1309), it advances the process to step S1310. If the system controller 50 determines not to resume the setting processing, that is, the user has selected the icon 1702 (NO in step S1309), it advances the process to step S1319.

A case where the system controller 50 determines in step S1309 to resume the security parameter setting processing will be explained. In this case, the system controller 50 performs processing of resuming the security parameter setting processing from a state upon suspension.

The system controller 50 sets OFF the setting suspended flag (step S1310).

The system controller 50 displays a menu and the like upon suspension on the notifying unit 54 based on the suspension information stored in the memory 52 (step S1311).

The system controller 50 resumes the security parameter setting processing from a suspended menu item, and sets new security parameters based on a user operation or the like (step S1312). At this time, the system controller 50 executes processes which have not been done before suspension out of security parameter setting processes. The burden of setting processing on the user can be reduced by resuming the setting processing based on information stored upon suspension.

If the system controller 50 determines that all steps of the security parameter setting processing has ended (YES in step S1313), it advances the process to step S1314. If the system controller 50 determines that any steps of the security parameter setting processing has not yet ended (NO in step S1313), it repeats the process (step S1312).

If the system controller 50 determines that there is an image to be transferred (YES in step S1314), it executes security processing and transfer processing in accordance with security parameters newly set in step S1312 (step S1315). If the system controller 50 determines that there is no image to be transferred (NO in step S1314), it ends the process.

Upon completion of the transfer processing in step S1315, the system controller 50 determines whether the setting suspended flag is ON (step S1316). If the process reaches this step via step S1310, the setting suspended flag is OFF. Hence (NO in step S1316), the system controller 50 ends the process.

The case where the system controller 50 determines in step S1309 to resume the security parameter setting processing has been explained.

Next, a case where the system controller 50 determines in step S1309 not to resume the security parameter setting processing (NO in step S1309) will be explained.

In this case, the system controller 50 performs security processing with security parameters which have already been set. More specifically, the system controller 50 reads out security parameters stored in the nonvolatile memory 56 (step S1319), and executes security processing and image transfer (step S1315).

Upon completion of the transfer processing, the system controller 50 determines whether the setting suspended flag is ON (step S1316). If the process reaches this step via step S1319, the setting suspended flag is ON (see step S1307).

If the system controller 50 determines that the setting suspended flag is ON (YES in step S1316), it displays the eighth selection window on the notifying unit 54 (step S1317). The eighth selection window prompts the user to select whether to continuously set security parameters.

The input unit 75 accepts, via the display of the eighth selection window, an instruction whether to resume setting of security parameters. The system controller 50 determines, from the selection instruction, whether to resume the setting processing. If the system controller 50 determines to resume the setting processing (YES in step S1318), it advances the process to step S1310 (D). If the system controller 50 determines not to resume the setting processing (NO in step S1318), it ends the process.

As described above, when interruption processing occurs during security parameter setting processing, the digital camera according to the embodiment first executes processing of receiving and storing a transfer request. The transfer request can be reliably stored.

Before security processing performed after image sensing processing, the digital camera according to the embodiment allows the user to select whether to resume security parameter setting processing. Even if interruption processing occurs, security processing can be done upon completion of setting new security parameters.

When security parameter setting processing does not become resumed, the digital camera according to the embodiment performs security processing using security parameters stored in the nonvolatile memory 56. For example, when the user wants to transfer an image quickly, security processing can be performed without waiting for the completion of suspended setting processing. This can shorten the time until an image is transferred.

The digital camera according to the embodiment prompts the user to select whether to perform security processing after newly setting security parameters or perform security processing using stored security parameters. This implements flexible setting processing proper for the user situation.

The above-described aspects of the present invention can be achieved by representing functions of image capturing apparatuses as a program, where the program is previously written on a recording medium, such as a ROM, inserting the ROM into an image capturing apparatus, and causing the image capturing apparatus to execute the program.

In such a case, a state where the program is read out from the ROM and is executed realizes the functions according to the above-described exemplary embodiments. Thus, the program and the ROM having the program recorded thereon constitute the present invention.

The program that realizes the functions of the image capturing apparatus according to the above-described exemplary embodiments may be provided after being recorded on a recording medium. For example, a semiconductor medium (such as a ROM or a nonvolatile memory), an optical recording medium (such as a DVD, an MO, an MD, or a CD), or a magnetic recording medium (such as a magnetic tape or a floppy disk) can be used as the recording medium. Alternatively, the above-described program may be provided by receiving the program having been stored in a storage device from a server apparatus computer through a communication network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-148623, filed Jun. 4, 2007 which is hereby incorporated by reference herein in its entirety.

What is claimed is:

1. An image capturing apparatus which has an image sensing unit and a processing unit that executes processing for an image sensed by the image sensing unit, and which can sequentially execute image sensing processing by the image sensing unit and processing by the processing unit in accordance with an image sensing instruction, the apparatus comprising:
 a first storage unit adapted to store a parameter associated with the processing by the processing unit;
 a changing unit adapted to change the parameter stored in the first storage unit; and
 a control unit adapted to, if the image sensing instruction is issued during parameter changing processing by the changing unit, control to execute the image sensing processing by the image sensing unit before completion of the parameter changing processing, and then to execute the processing by the processing unit for the image sensed in accordance with the image sensing instruction issued during the parameter changing processing, using the parameter changed by the changing unit upon completion of executing the parameter changing processing by the changing unit.

2. The apparatus according to claim 1, wherein, if the image sensing instruction is issued while the parameter is changed, the control unit controls to suspend the parameter changing processing by the changing unit, and to resume the parameter changing processing by the changing unit upon completion of image sensing by the image sensing unit.

3. The apparatus according to claim 2, further comprising a second storage unit adapted to store information changed by the changing unit if the image sensing instruction is issued,
 wherein the control unit controls to execute the parameter changing processing by the changing unit on the basis of information stored in the second storage unit.

4. The apparatus according to claim 1, further comprising a first selection unit adapted to select whether to execute the parameter changing processing by the changing unit before executing the processing by the processing unit,
 wherein based on selection by the first selection unit, the control unit controls to execute the parameter changing processing by the changing unit before executing the processing by the processing unit.

5. The apparatus according to claim 4, wherein,
if the first selection unit selects not to execute the parameter changing processing by the changing unit before executing the processing by the processing unit, the control unit controls to execute the processing by the processing unit using a parameter stored in the first storage unit.

6. The apparatus according to claim 5, further comprising a second selection unit adapted to select whether to execute the parameter changing processing by the changing unit after executing the processing by the processing unit,
wherein based on selection by the second selection unit, the control unit controls to execute the parameter changing processing by the changing unit.

7. The apparatus according to claim 1, wherein
the processing by the processing unit includes processing of transferring an image sensed by the image sensing unit to an external apparatus.

8. The apparatus according to claim 1, wherein
the processing by the processing unit includes processing of encrypting an image sensed by the image sensing unit.

9. The apparatus according to claim 1, wherein
the processing by the processing unit includes color processing for an image sensed by the image sensing unit.

10. The apparatus according to claim 1, wherein
the processing by the processing unit includes compression processing for an image sensed by the image sensing unit.

11. A method of controlling an image capturing apparatus which has an image sensing unit and a processing unit that executes processing for an image sensed by the image sensing unit, and which can sequentially execute image sensing processing by the image sensing unit and processing by the processing unit in accordance with an image sensing instruction, the method comprising:
storing a parameter associated with the processing by the processing unit;
changing the parameter stored in the storing; and
controlling, if the image sensing instruction is issued during parameter changing processing in the changing, to execute the image sensing processing by the image sensing unit before completion of the parameter changing processing in the changing, and then to execute the processing by the processing unit for the image sensed in accordance with the image sensing instruction issued during the parameter changing processing, using the parameter changed by the changing upon completion of executing the parameter changing processing in the changing.

12. A computer-readable storage medium storing computer-readable instructions, the computer-readable instructions causing a computer to execute the method of claim 11.

* * * * *